(12) United States Patent
Littlejohn et al.

(10) Patent No.: US 11,799,572 B2
(45) Date of Patent: Oct. 24, 2023

(54) VERIFICATION OF BROADCAST LOG BY PLAYOUT SYSTEM

(71) Applicant: iHeartMedia Management Services, Inc., San Antonio, TX (US)

(72) Inventors: Jeffrey Lee Littlejohn, Mason, OH (US); Mark R. Allen, Aliso Viejo, CA (US); David C. Jellison, Jr., Ogallala, NE (US); Curt Lutringer, Mission Viejo, CA (US); Joseph Brewer, Garden City, NY (US)

(73) Assignee: BANK OF AMERICA, N.A., Charlotte, NC (US)

( * ) Notice: Subject to any disclaimer, the term of this patent is extended or adjusted under 35 U.S.C. 154(b) by 769 days.

(21) Appl. No.: 16/732,562

(22) Filed: Jan. 2, 2020

(65) Prior Publication Data

US 2020/0136734 A1 Apr. 30, 2020

Related U.S. Application Data

(63) Continuation of application No. 16/012,507, filed on Jun. 19, 2018, now Pat. No. 10,547,398, which is a
(Continued)

(51) Int. Cl.
| | |
|---|---|
| *H04N 21/262* | (2011.01) |
| *H04N 21/81* | (2011.01) |
| *H04H 20/10* | (2008.01) |
| *H04H 60/06* | (2008.01) |
| *H04H 60/37* | (2008.01) |
| *G06F 16/60* | (2019.01) |

(Continued)

(52) U.S. Cl.
CPC .......... *H04H 20/103* (2013.01); *G06F 16/60* (2019.01); *G06F 17/00* (2013.01); *G06Q 30/00* (2013.01); *G06Q 30/02* (2013.01); *H04H 60/06* (2013.01); *H04N 21/26241* (2013.01); *H04N 21/812* (2013.01); *H04H 60/375* (2013.01)

(58) Field of Classification Search
CPC .................................................. H04N 21/812
See application file for complete search history.

(56) References Cited

U.S. PATENT DOCUMENTS

| | | |
|---|---|---|
| 6,223,210 B1 | 4/2001 | Hickey |
| 6,577,716 B1 | 6/2003 | Minter et al. |

(Continued)

*Primary Examiner* — Hsiungfei Peng
(74) *Attorney, Agent, or Firm* — Harness, Dickey & Pierce, P.L.C.

(57) ABSTRACT

A media playout system receives a broadcast log transmitted from a media scheduling system. The broadcast log includes a restricted show, and the media playout system makes a first determination a blackout period assigned to the restricted show. The blackout period indicates a period of time associated with the restricted show during which at least one media item is prohibited from being scheduled. The media player also determines that the broadcast log indicates that the at least one media item has been improperly scheduled during the blackout period. In response to determining that the at least one media item has been improperly scheduled during the blackout period, the media playout system transmits, to the media scheduling system, a message requesting a replacement media item to replace the at least one media item that has been improperly scheduled during the blackout period.

13 Claims, 16 Drawing Sheets

Related U.S. Application Data continuation of application No. 14/341,234, filed on Jul. 25, 2014, now abandoned, which is a continuation-in-part of application No. 13/693,010, filed on Dec. 3, 2012, now Pat. No. 9,135,218, which is a continuation-in-part of application No. 12/966,406, filed on Dec. 13, 2010, now Pat. No. 8,326,215, which is a continuation of application No. 11/535,347, filed on Sep. 26, 2006, now Pat. No. 7,899,390.

(51) Int. Cl.
*G06Q 30/00* (2023.01)
*G06Q 30/02* (2023.01)
*G06F 17/00* (2019.01)

(56) References Cited

U.S. PATENT DOCUMENTS

| | | |
|---|---|---|
| 6,701,355 B1 | 3/2004 | Brandt et al. |
| 6,964,061 B2 | 11/2005 | Cragun et al. |
| 7,017,120 B2 | 3/2006 | Shnier |
| 7,051,351 B2 | 5/2006 | Goldman et al. |
| 7,346,320 B2 | 3/2008 | Chumbley et al. |
| 7,610,597 B1 | 10/2009 | Johnson et al. |
| 7,689,705 B1 | 3/2010 | Lester et al. |
| 8,255,949 B1 | 8/2012 | Bayer et al. |
| 2004/0093253 A1 | 5/2004 | Iijima |
| 2005/0022253 A1 | 1/2005 | Chen et al. |
| 2005/0198317 A1 | 9/2005 | Byers |
| 2006/0092282 A1 | 5/2006 | Herley et al. |
| 2006/0195859 A1* | 8/2006 | Konig .............. H04N 21/44016 382/199 |
| 2007/0039018 A1* | 2/2007 | Saslow .............. H04N 21/8352 725/19 |
| 2007/0143466 A1 | 6/2007 | Shon et al. |
| 2008/0059631 A1 | 3/2008 | Bergstrom et al. |
| 2009/0053991 A1 | 2/2009 | Mantel et al. |
| 2011/0078740 A1* | 3/2011 | Bolyukh .............. H04N 21/812 725/41 |
| 2011/0125595 A1 | 5/2011 | Neal et al. |

\* cited by examiner

VERIFICATION OF BROADCAST LOG BY PLAYOUT SYSTEM

CROSS REFERENCE TO RELATED PATENTS

The present U.S. Utility Patent Application claims priority pursuant to 35 U.S.C. § 120 as a continuation of U.S. Utility application Ser. No. 16/012,507, entitled "CONTROLLING ALTERATION OF ITEMS INSERTED INTO A BROADCAST LOG," filed Jun. 19, 2018, which is a continuation of U.S. Utility application Ser. No. 14/341,234, entitled "SCHEDULING ADVERTISING DURING RESTRICTED PERIODS," filed Jul. 25, 2014, abandoned, which is a continuation-in-part of U.S. application Ser. No. 13/693,010, entitled "SONG REPLACEMENT WITH CONTENT SCHEDULING IN STREAMING MEDIA," filed Dec. 3, 2012, issued as U.S. Pat. No. 9,135,218 on Sep. 15, 2015, which is a continuation-in-part of U.S. Utility application Ser. No. 12/966,406, entitled "METHOD AND SYSTEM FOR SELECTIVELY BROADCASTING MEDIA, filed Dec. 13, 2010, issued as U.S. Pat. No. 8,326,215 on Dec. 4, 2012, which is a continuation of U.S. Utility application Ser. No. 11/535,347, entitled "METHOD AND SYSTEM FOR SELECTIVELY BROADCASTING MEDIA," filed Sep. 26, 2006, filed Sep. 26, 2006, issued as U.S. Pat. No. 7,899,390 on Mar. 1, 2011, all of which are hereby incorporated herein by reference in their entirety and made part of the present U.S. Utility Patent Application for all purposes.

FIELD

The present invention relates to broadcast logs, and more particularly to verifying broadcast logs by a playout system.

BACKGROUND

Many broadcast stations, such as radio broadcast stations, use computers running broadcast automation software, such as the NexGen Digital™ radio broadcast automation software provided by Prophet Systems Innovation, to automate some, if not all, of an entire broadcast. Broadcast content typically includes various media events such as songs, movies, advertisements, jingles, news spots, traffic, radio host commentary, interviews, station identification, segues, beds, promos, station identification, time and temperature, voice tracks and the like.

Generally, broadcast content is stored electronically in individual files, and is compiled into a broadcast program log or playlist that may include a chronological arrangement of various types of broadcast content to create the desired listening "experience." For example, a playlist for a radio music program may include a series of songs with station identification and advertisements interspersed at various intervals.

Many broadcast stations are part of larger broadcast systems or networks that allow broadcast programs to be shared. For example, one broadcast station may host a live program, record that program, and transmit that program to another broadcast station for rebroadcast.

When networked broadcast stations share programming, content broadcast transmitted from one broadcast station may not be appropriate for another broadcast station. For example, a broadcast program may include songs, movies and/or advertisements pertinent to a particular audience and not to another audience. Or, a program from one broadcast station may be transmitted to multiple broadcast stations having diverse audiences, such as paid subscribers to an Internet-based broadcast, or to HD radio listeners, and certain content may be undesirable for that audience.

In some cases, a main station may broadcast songs that are streamed on a streaming station. In some such cases, it may be desirable to substitute different commercial content on the streaming station. Conventional methods of substituting commercial content generally require substituting content that has the same length as the replaced content. Except in very limited circumstances, these conventional techniques are not suitable for substituting non-commercial content, because of the length of different non-commercial content varies significantly from one item to the next. Some have attempted to get around the limitations of conventional techniques by employing a complete black out of content on a stream, or by simply not streaming at all. These techniques are less than optimal.

DETAILED DESCRIPTION

A detailed description is provided primarily in the context of radio broadcasting, but those skilled in the art will appreciate that the invention is not limited to radio broadcast operations. As described more specifically with respect to particular figures, an integrated media automation system can be used to ensure that advertisers who do not want to be associated with a controversial show will not have their advertisements aired during that show. For example, some widely broadcast media shows may be associated with a point of view that is controversial, or contrary to, an advertiser's point of view. The advertiser may not want to take a chance that his product will be dragged into the controversy associated with the show, or may want to avoid validating the contrary viewpoint espoused by the show. Regardless of the advertiser's motivations, an advertiser may not want his advertisements aired during the show, which is referred to herein as a "restricted show," or a "restricted period."

In general, a restricted show is a talk show, song, video, event, or other media item included in a broadcast schedule, during which at least one advertiser has prohibited placement of advertisements. The period of time during which a restricted show is scheduled for broadcast is sometimes referred to herein as a "restricted period," a "blackout period," a "blackout time," or some similar derivative of these terms. A blackout period can include a buffer either before, after or both before and after the exact time during which a restricted show is scheduled to air. Thus, spot breaks immediately before and after a restricted show can also be restricted. Similarly, an entire daypart, hour, or portion of an hour that includes a restricted show can be made part of a blackout period associated with the restricted show.

An integrated media automation system can prevent placement of an advertiser's advertisements into spot breaks occurring during, or near, the restricted show. The advertiser requesting the restriction can be tagged, added to a list, or otherwise identified and classified during an order taking process, or at some other time. Likewise, the restricted show, or a period around and including the restricted show, can be tagged. The media automation system can then schedule advertisements for spot breaks in and around the restricted show to take into account the advertiser's prohibitions, thereby preventing advertisements associated with the prohibiting advertiser from being scheduled during the restricted show. The spot breaks in and around the restricted show can also be marked for special handling by a playout system, so that manual replacement of advertisements, or any other type of automated advertisement replacement function, is prevented. The playout system can perform a verification to ensure that no prohibited advertisements are aired during restricted time periods.

Figure 1:
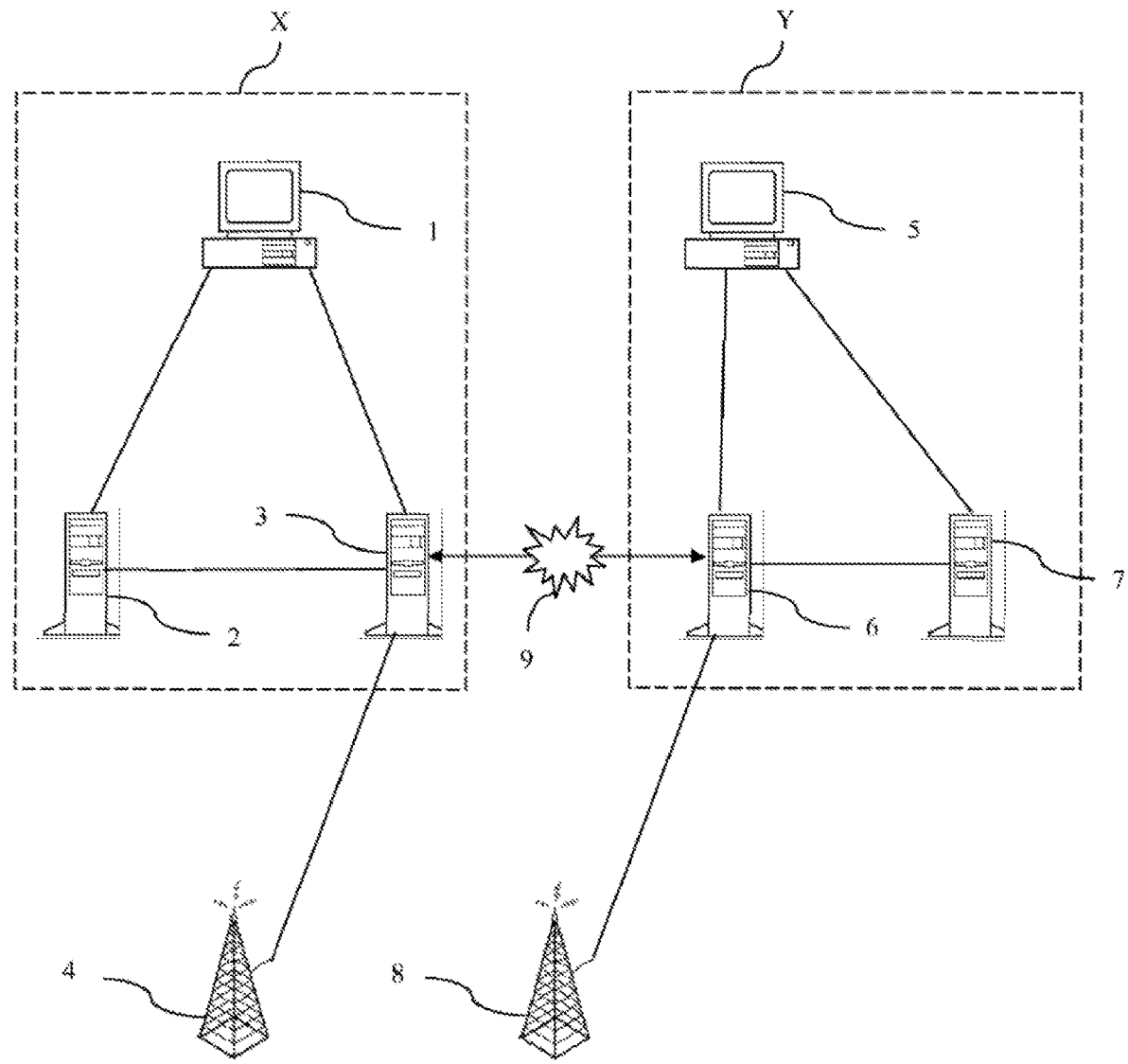
FIG. 1 depicts one embodiment of a broadcast system having a first broadcast station X and a second broadcast station Y.

A variety of different systems can be used to schedule advertising during restricted periods, as disclosed herein. As seen in the embodiment of FIG. 1, a broadcast station X may include a primary workstation 1 using broadcast automation software to automate broadcast operations. The broadcast station X may be referred to herein as a "main radio station." The primary workstation 1 may be connected to a primary file server 2 and a primary audio server 3. Another broadcast station Y, which may be referred to herein as a downstream radio station, may include a secondary workstation 5 also using broadcast automation software to automate broadcast operations. The secondary workstation 5 may be connected to a secondary file server 7 and a secondary audio server 6. In this embodiment, the primary audio server 3 and secondary audio server 6 are connected to antennas 4 & 8, respectively. In this embodiment, the primary audio server 3 is connected to the secondary audio server 6 through a network 9, such as the Internet or wide area network. Such connection may, of course, be direct or indirect, electrical and/or physical, and may be wired or wireless. Those skilled in the art will recognize that the primary workstation 1 and secondary workstation 5, along with their respective file servers 2 & 7 and audio servers 3 & 6, may be co-located at a broadcast station or located apart, and may, for example, serve different radio audiences.

In this embodiment, the primary and secondary workstations 1 & 5 each use NexGen Digital™ v.2.4.19.1 broadcast automation software. The primary file server 2 and primary audio server 3 connected to the primary workstation 1 may, for example, be mounted in a common rack and connected to other hardware that may be used for broadcast station operation, such as to an audio switcher, a universal power supply, digital reel-to-reel hardware, real-time editor hardware, mixing boards and the like. A similar arrangement may be provided for the secondary workstation 5, secondary file server 7 and secondary audio server 6. Those skilled in the art will recognize that the environment illustrated in FIG. 1 and described herein is not intended to limit the present invention. Indeed, those skilled in the art will recognize that other alternative hardware and environments may be used without departing from the scope of the present invention. A server computer may, for example, include a processor, a random access memory, data storage devices (e.g. hard, floppy, and/or CD-ROM disk, drives, etc.), data communications devices (e.g., modems, network interfaces, etc.), display devices, (e.g., CRT display, LCD display, etc.), and input devices (e.g., mouse pointing devices, keyboard, CD-ROM drive, etc.). A server may, for example, be attached to other devices, such as a read-only memory, a video card, a bus interface, a printer, etc. Those skilled in the art will appreciate that any combination of the above components, or any number of different combinations, peripherals, and other devices, may be used with the server. Likewise, those skilled in the art will recognize that various servers, workstations, hardware and software described herein, whether termed "file server," "audio server," "workstation," "first server," "second server," "switcher," "editor," "storage device," "broadcast automation software," "buffer," "adapter," "broadcast station" and the like, and the capabilities and features ascribed thereto, may refer to different functions, programs and/or applications of one or more computing devices in a single location or spread over multiple locations, and may be implemented in hardware or software or some combination of the two.

In this embodiment, the primary and secondary file servers 2 & 7 may be used to store various media events, and the primary and secondary audio servers 3 & 6 may be used to mix and play media events, for example, over the air or over the Internet as a radio broadcast. Accordingly, the primary and secondary audio servers 3 & 6 may each be provided with a multi stream PCI audio adapter (not shown) designed for broadcast use and having, for example, one "record" stream input and six "play" stream outputs. Such an adapter may be any suitable adapter, and may, for example, be the model ASI6122 audio adapter from Audioscience.

Figure 2:
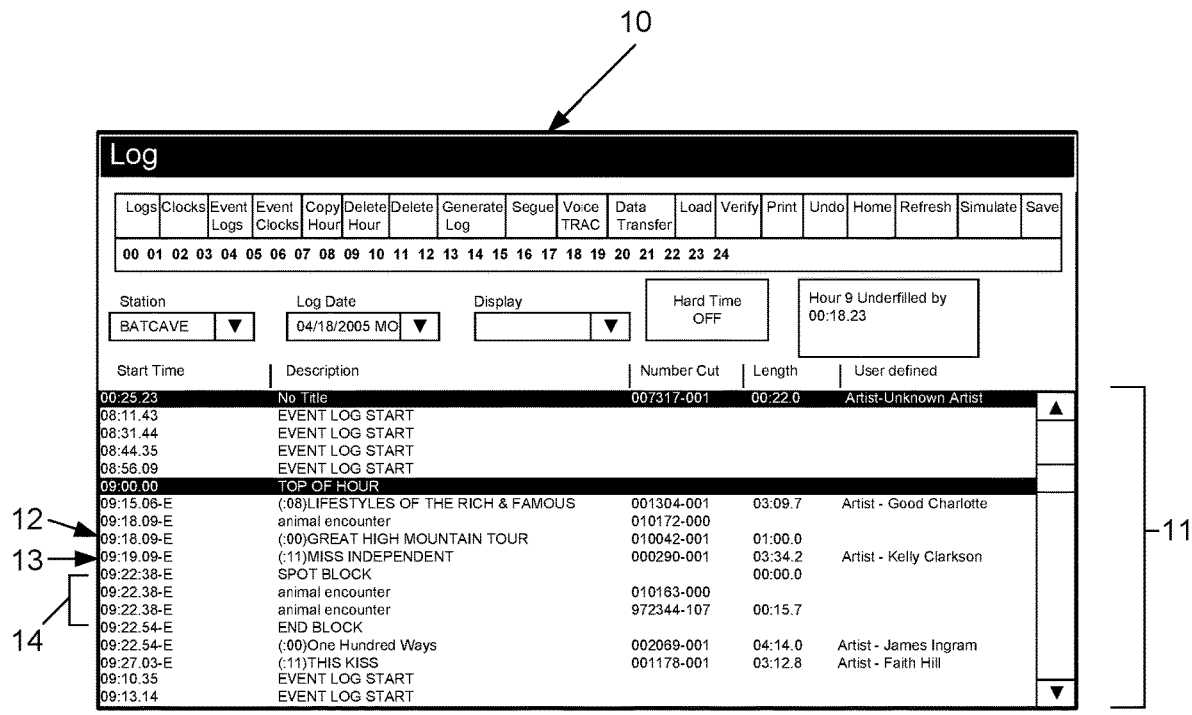
FIG. 2 depicts one embodiment of a media event log.

A user at the primary workstation 1 may create a radio broadcast program by using the broadcast automation software to arrange audio content into a log of media events. As seen in the embodiment of FIG. 2, the exemplary broadcast automation software allows a broadcast station to automate the production of a radio program through creation of a media event log 11, from which a playlist may be generated. As used herein, the terms "log" and "playlist" may be used interchangeably. As used in the claims, the term "automation playlist" includes both "log" and "playlist," and generally connotes a sequence of media events. In the event log interface 10, a broadcaster may define, over a 24-hour period, when and how various media events will be played in order to create the radio broadcast "experience," as is known to those skilled in the art. The media event log 11 may thus generally be a time-based collection of media events arranged in playback order, and may include metadata associated with the media events, such as song title, artist, radio station identification, macros (user-defined sequences of media events) and the like. Generally, a media event log may cover a day's worth of programming, but other time periods may be used, as well, and the event log 11 may be planned and created well in advance of actual broadcast. The event log 11 may, for example, indicate to the broadcaster whether airtime has been adequately filled, and describe the type of media events to fill various day parts.

In the embodiment of FIG. 2, the media event log 11 provides a list of media events arranged according to the time during which each media event will play. In this embodiment, the event log 11 sets out an exemplary morning show radio program that includes advertisement spots and songs. For example, a one-minute long "Great High Mountain Tour" advertisement spot 12 is shown as scheduled to play at 9:18:09, followed by the "Miss Independent" song 13 by artist Kelly Clarkson, which is shown as scheduled to play at 9:19:09. Also, for example, an "animal encounter" advertisement spot 14 is scheduled to begin play at 9:22:38, and end at 9:22:54.

As is known in the art, the relationship between the media events may be defined to enhance the radio broadcast "experience." The various transitions between media events may include, for example, crossfades, overlap, clipping, ducking, and fade in and fade out. In the audio context, for example, "fading" generally refers to the process of changing the volume of a media event over time. "Fade in" and "fade out" thus generally refer to increasing and decreasing, respectively, the volume of a media event over time, and "cross fading" generally refers to simultaneously fading out the end of one media event, while fading in the beginning of the next media event. "Fading" is commonly done at the beginning and end of a media event, but may be accomplished during other portions of a media event, as well. "Clipping" generally refers to the process of excluding a portion of a media event during playback, such as the beginning or end of a song or video element. "Ducking" generally refers to reducing the volume level of background audio while another media event, such as a voice track, is playing. "Overlap" generally refers to simultaneous performance of media events.

So defined and arranged, the media events of such a log, or playlist, may be played in real-time as, for example, an on-air broadcast to provide the radio broadcast "experience." With reference to FIG. 1, the broadcast automation software running on the primary workstation 1 directs retrieval of the media events listed in the playlist from the primary file server 2, and directs the primary audio server 3 to mix and play the media events as they appear in the media event log or playlist. The primary audio server 3 may play the media events for broadcast via antenna 4. Those skilled in the art will recognize that broadcast could easily be over the Internet or some other network. Those skilled in the art will appreciate that the term "broadcast" includes transmission of media from one to many, e.g., from a broadcast station or network of broadcast stations to a consuming audience, by any transmission medium.

Figure 3:
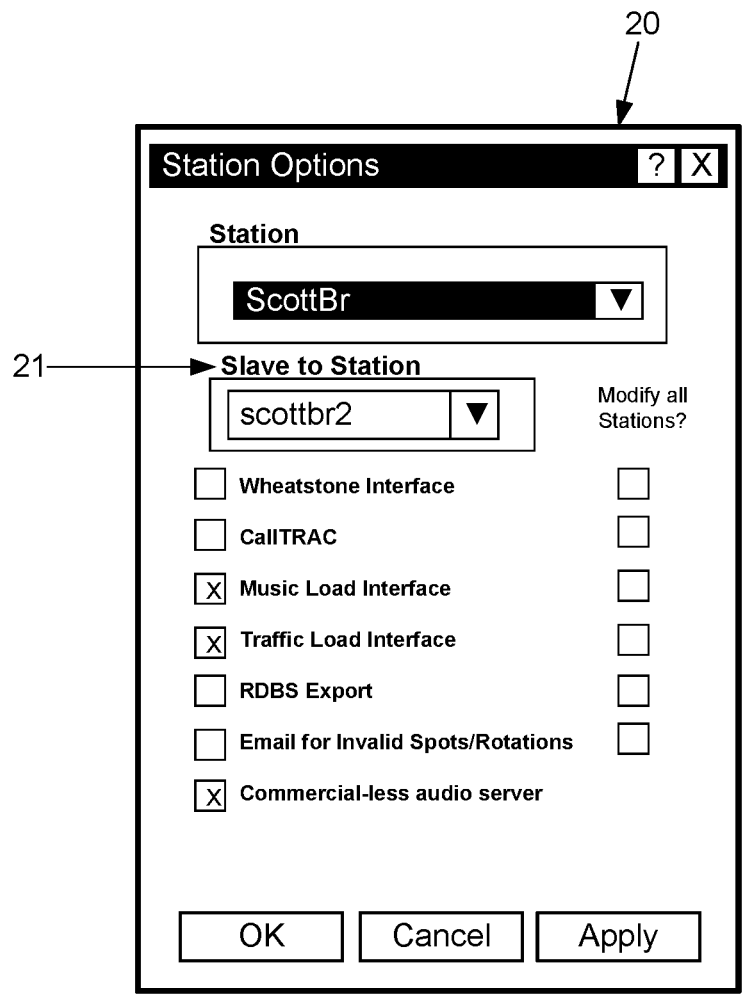
FIG. 3 depicts an embodiment of a user interface that may be provided by broadcast automation software for establishing the relationship between two broadcast stations.

In this embodiment, the secondary audio server 6 may be configured to function as a slave to the primary audio server. With reference to FIGS. 1 and 3, a user at the secondary workstation 5 may establish the relationship 21 between the secondary audio server (represented by the "Commercial-less Audio Server" in the list of stations) and primary audio server (represented by the "scottbr2" station) through a user interface 20 that may be provided by the broadcast automation software running on the secondary workstation 5. Thus, in addition to broadcasting the media events via antenna 4, the primary audio server 3 may also play the media events directly to the secondary audio server 6. Such play may be in real-time. Specifically, the primary audio server 3 may play through an output of its audio adapter the media events into the input of the secondary audio server's 6 audio adapter. The secondary audio server 6 store the media stream in a buffer until directed by the secondary workstation to start playing the buffered media as, for example, an over-the-air broadcast via antenna 8. Those skilled in the art will appreciate that the buffer may be any suitable computer-readable medium.

Figure 4:
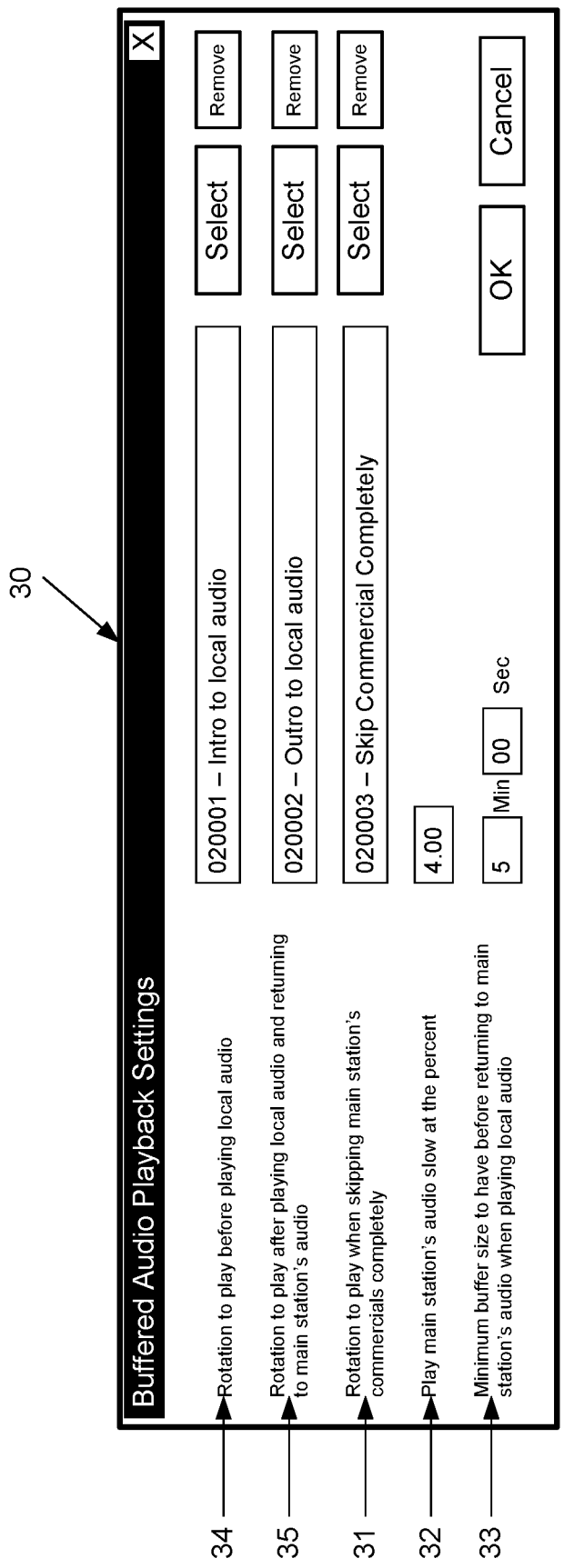
FIG. 4 depicts an embodiment of a user interface that may be provided by broadcast automation software for configuring playback of media events from a buffer.

In this embodiment, when playing media events from the secondary audio server 6 buffer, various undesired media events may be skipped. For example, it may be desired to play a rotation in which all of the advertisements are skipped. As seen in the embodiment of FIG. 4, the broadcast automation software running on the secondary workstation may accordingly provide a user interface 30 to permit that rotation 31 to be specified.

Figure 5:
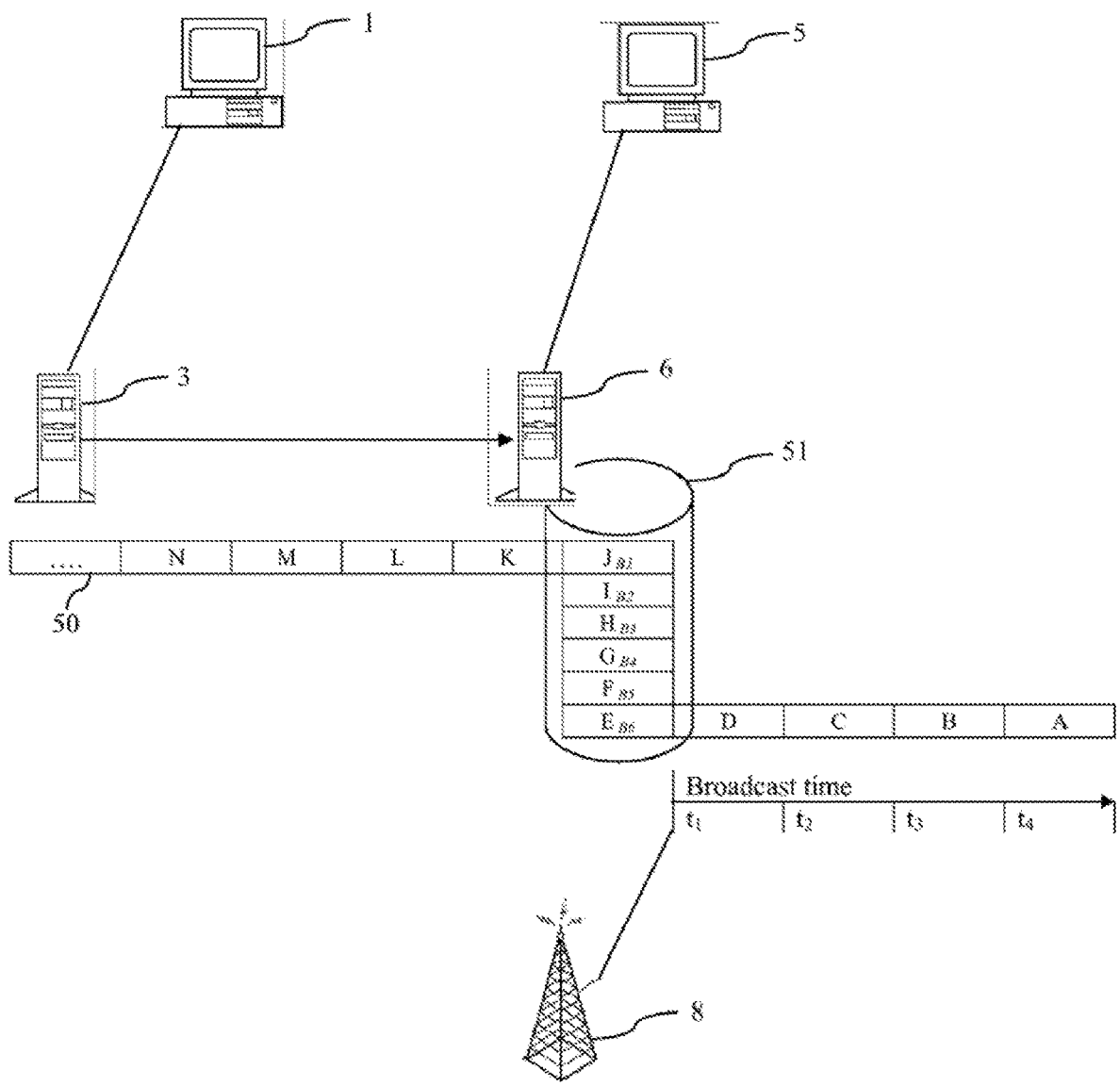
FIG. 5 depicts playing media events from a first audio server into the buffer of a second audio server, and broadcasting those media events from the second audio server.

With reference to the embodiment of FIG. 5, the primary audio server 3 may play a sequence 50 of media events A, B, C, D, ... in real time into the buffer 51 of the secondary audio server 6 (the file servers 2 and 7 of FIG. 1 are not shown here). That is, the sequence 50 of media events may be streamed from the primary audio server 3 to the buffer 51, and after a portion of that sequence 50 has been stored in the buffer 51, the sequence 50 of media events may be broadcast from antenna 8 at broadcast time $t_1$ from the secondary audio server 6 on a first-in first-out basis. Generally, amount of buffer $B_1 \ldots B_6$ may be specified to be a certain duration of real-time media event play. Use of the buffer 51 allows the playlist of media events to be altered prior to broadcasting, as discussed in further detail below.

Figure 6:
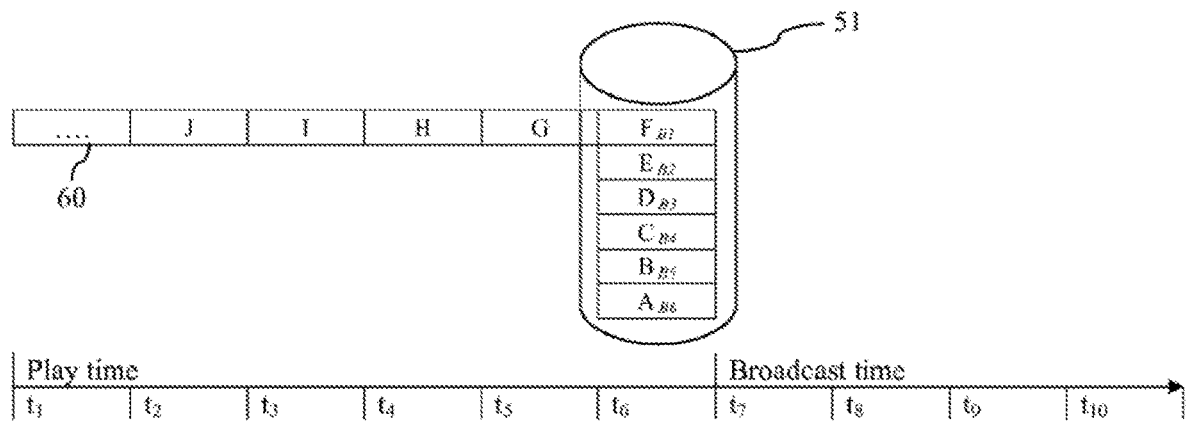
FIG. 6 depicts playing media events from a first audio server into the buffer of a second audio server at time t1 prior to broadcasting.

In one embodiment, the primary audio server 3 and the secondary audio server 6 may be scheduled to begin broadcasting the same play list of media events at the same time. The primary audio server 3 may, for example, broadcast the playlist of media events to one audience, and the secondary audio server 6 may broadcast an advertisement-free version of that playlist to another audience. The primary audio server 3 may begin streaming 60 the media events, in playlist sequence, into the buffer 51, as seen with reference to FIG. 6. If, for example, a buffer of six minutes $B_1 \ldots B_6$ is desired, the primary audio server 3 may begin playing the stream 60 of media events A, B, C, ... into the buffer six minutes (at time $t_1$) before the scheduled broadcast time $t_7$. Thus, at the broadcast time $t_7$, the buffer 51 will contain six minutes-worth of audio.

Figure 7:
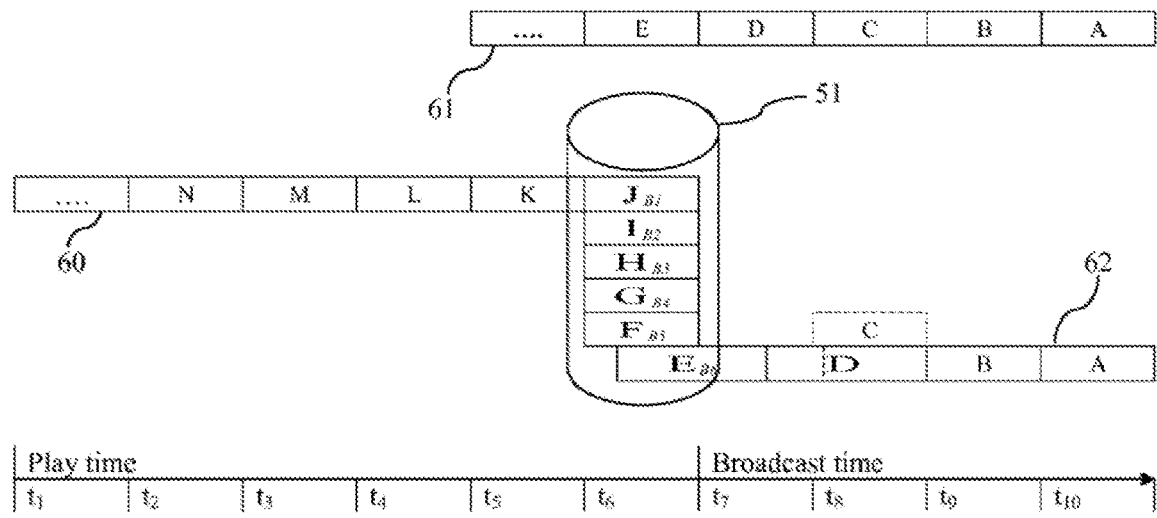
FIG. 7 depicts the media events of the embodiment of FIG. 6 broadcast from both the primary audio server and secondary audio server starting at broadcast time $t_7$ and continuing through time $t_{10}$, the media events also played from the primary audio server to the buffer of a second audio server, where broadcast from the second audio server involves skipping a media event and stretching subsequent media events while broadcasting to compensate for such skipping.

Turning to FIG. 7, broadcast of stream 61 of media events from the primary audio server 3 and broadcast of stream 62 from the secondary audio server 6 may be scheduled to begin at time $t_7$. In FIG. 7, broadcast has begun and has continued through time $t_{10}$. During that time, the primary audio server 3 may continue to play the stream 60 of media events into the buffer 51. As noted above, the primary audio server 3 may be provided with an audio adapter that allows multiple output streams 60 & 61.

In this embodiment, the user has configured the broadcast automation software of the secondary workstation 5 to instruct the audio server 6 to identify and not play advertisement spots. In the embodiment of FIG. 2, for example, spots to be skipped may be marked by the primary audio server with special markers that are displayed in the media event log 11 as "spot blocks," as with the animal encounter spot 14. According to that embodiment, the secondary audio server 6 may then detect those spot blocks and skip the spot or spots marked by the spot blocks.

In the embodiment of FIG. 7, spot C may be an advertisement spot. Spot C may be desired in the media event stream 61 from the primary audio server 3, but undesired in the media event stream 62 from the secondary audio server 6. Accordingly, spot C may be identified and not played from the buffer, and the secondary workstation's 5 broadcast automation software may instruct the secondary audio server 6 to play media event D immediately after playing media event B. Removal of spot C from the rotation, however, shortens the scheduled play list by some amount of time, i.e., the buffer amount is "used up" by skipping media events. To fill that airtime gap, the broadcast automation software may instruct the audio server 6 to slow down (stretch out) playback of one or more, or all, subsequent spots. In this embodiment, the user may configure the broadcast automation software to instruct the secondary audio server 6 to immediately play media event D after media event B and stretch, i.e., slow down, the subsequent media events D, E, F, .... As seen in FIG. 4, for example, the user has specified a stretch percentage 32 of 4%, and in this embodiment may stretch playback by up to 20%. Stretching subsequent songs by 4%, for example, may fill an additional 2.4 minutes of airtime per hour. In this embodiment, such stretching may be accomplished, as is known in the art, without altering the pitch of subsequent spots to avoid, for example, "draggy turntable" voices. Those skilled in the art will appreciate that other stretching and/or squeezing ratios may be applied. Alternatively, the broadcast automation software may be configured to instruct the audio server 6 to stretch out playback of only certain spots, for example, only media events D and E, as may be needed to fill airtime gap left by removal of spot C. In this embodiment, such stretching may be utilized for as long as may be needed to re-fill the buffer 51 to a minimum amount of media event play time. That is, media events in the media stream 62 may be played out from the buffer 51 more slowly than the media events of the stream 60 are played from the primary audio server 3 into the buffer 51, and the difference in play rate results in re-filling the buffer 51.

Referring generally to the embodiment of FIG. 7, for example, it may be that media events A and B are songs, media event C is an advertisement spot, and media events D, E and F are songs (the remaining media events may be, in this example, of various types). In this example, each media event may be one minute long. Playback of songs A ... F will require 6 minutes of airtime. If broadcast is scheduled to begin from the primary audio server 3 and from the secondary audio server 6 at the top of the 9 a.m. hour (09:00:00), and a buffer of six minutes is required, the primary audio server 3 may begin playing the stream 60 of media events into the buffer 51 at 08:54:00, as described above in connection with the embodiment of FIG. 6. Thus, at broadcast time 09:00:00 ($t_7$), media events A ... F will be stored in the buffer 51 and ready for broadcast. In this embodiment, therefore, both the primary audio server 3 and the secondary audio server 6 will begin their broadcast at 09:00:00 with song A and followed by song B. Immediately after song B finishes playing, the primary audio server 3 will begin playing advertisement spot C. The secondary audio server will, however, remove advertisement C from the playlist rotation (as shown by the dash-marked "times lot" C), and begin playing song D immediately after playing song B. Removal of advertisement C shortens that airtime play of media events A ... F from the secondary audio server by one minute. To fill that airtime gap, and "catch up" to the broadcast 61 from the primary audio server 3, the secondary audio server 6 may stretch songs D, E and F to fill that space, so that the broadcast 62 from the secondary audio server 6 is substantially synchronous with the broadcast 61 from the primary audio server 3 by the time song F begins to play at 09:06:00. As noted above, of course, such stretching may be spread out over fewer or additional subsequent spots or all subsequent spots. Those skilled in the art will recognize that such stretching may, for example, be delayed until later in the playlist, or may be limited to song D. Generally, immediately playing song D after song B with or without stretching out one or more subsequent spots may draw down the amount of media event playtime stored in the buffer.

Figure 8:
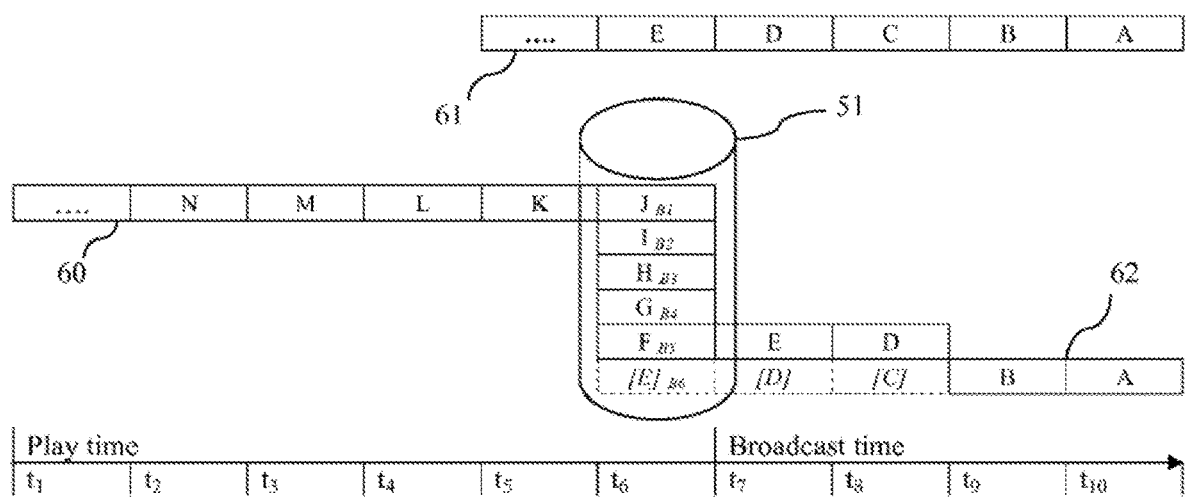
FIG. 8 depicts the media events of the embodiment of FIG. 6 broadcast from both the primary audio server and secondary audio server starting at broadcast time $t_7$ and continuing through time $t_{10}$, the media events also played from the primary audio server to the buffer of a second audio server, where broadcast from the second audio server involves skipping a media event and broadcasting media events subsequent to the skipped media event without stretching the subsequent media events.

Those skilled in the art will also recognize that stretching may not be used at all. In the embodiment of FIG. 8, spot C may be removed and songs D, E, F, ... may be played immediately after song B without stretching, and the buffer amount may be accordingly reduced to five minutes of airtime ($B_1 \ldots B_5$). The bracketed media event designations [C], [D] and [E] in the units marked by dashed lines illustrate the sequence of media events that would exist without removal of spot C.

Accordingly, an appropriate buffer may be established and maintained at a level sufficient to provide a reserve of media events to fill airtime gaps. For example, a minimum buffer size of five minutes may be sufficient to cover typical advertisement spots if stretching is used. For longer station breaks, such as for news, a longer buffer may be required, and may range, for example, between 7.5 minutes and 14 minutes. In the embodiment of FIG. 4, for example, the minimum buffer size 33 is set at five minutes.

Also, the broadcast 62 from the secondary audio server 6 may be supplemented from a secondary playlist. A user at the secondary workstation 6 may create a secondary log or playlist of media events suitable for the intended audience of the secondary broadcast station. The secondary log or play list may be created using the automation broadcast software to, for example, create a clock with empty song slots, define a music load format for the station (such as "R&B"), based on the music load format generate a log of music similar to the media event log 11 of FIG. 2, and load the music from the secondary file server 7 to the secondary audio server 6. Those skilled in the art will appreciate that the secondary play list may comprise a single type of media events or may comprise a variety of types of media events, such as songs, news and advertisements pertinent to the secondary station's broadcast audience, station identification, radio personality commentary and the like.

Figure 9:
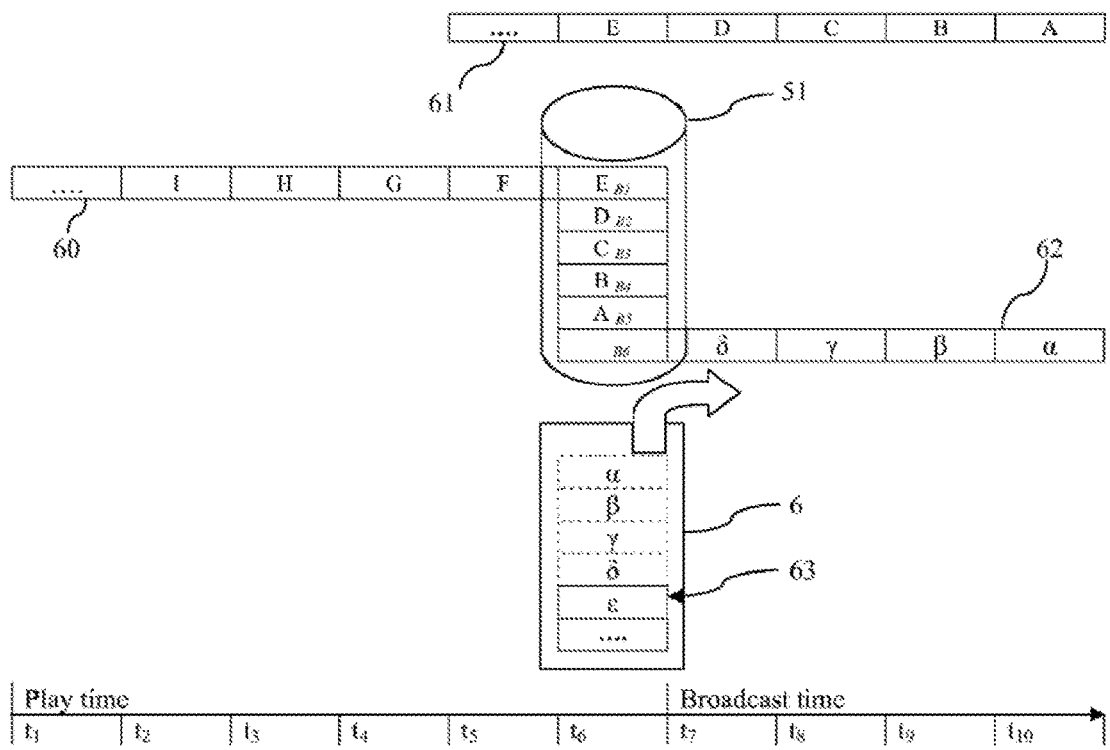
FIG. 9 depicts the media events of the embodiment of FIG. 6 both broadcast from the primary audio server and played into the secondary audio server starting at broadcast time $t_7$, and broadcasting a secondary play list from the secondary audio server at broadcast time $t_7$ until the buffer is sufficiently full to begin broadcasting the media events stored.

In one embodiment, with reference to FIG. 9, the primary audio server 3 may begin broadcasting the primary playlist at 09:00:00 (time $t_7$) while simultaneously playing the primary playlist to the buffer 51 of the secondary audio server 6. The secondary audio server 6 may broadcast from a secondary playlist 63 of spots $\alpha, \beta, \gamma, \delta, \varepsilon, \ldots$ at 09:00:00 while an adequate reserve $B_1 \ldots B_6$ of the media events from the primary audio server 3 is being stored in the buffer 51, and then switch over to broadcast of the buffered primary playlist when the buffer requirements $B_1 \ldots B_6$ are met. Thereafter, the secondary audio server 6 may remove undesired media events as described above.

Figure 10:
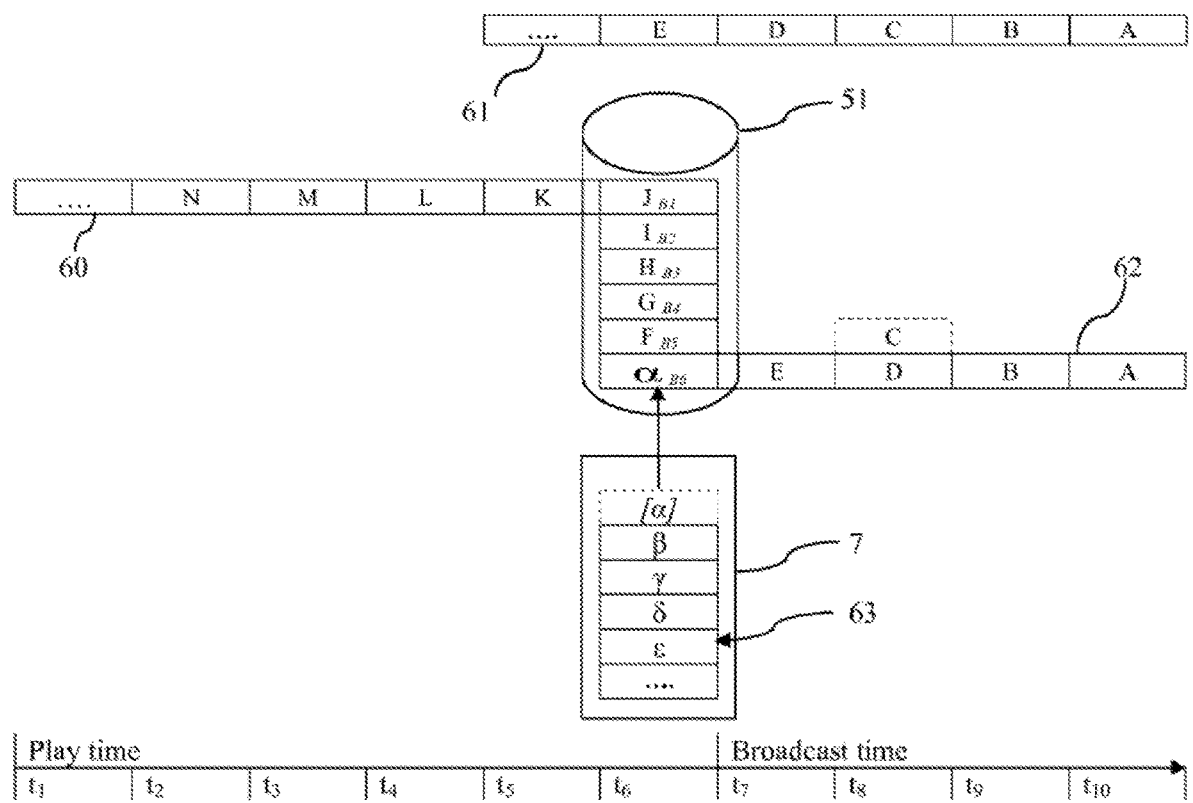
FIG. 10 depicts the media events of the embodiment of FIG. 6 broadcast from both the primary audio server and secondary audio server starting at broadcast time $t_7$ and continuing through time $t_{10}$, the media events also played from the primary audio server to the buffer of a second audio server, where broadcast from the second audio server involves skipping a media event, playing a subsequent media event and adding to the buffer a media event from an alternative play list.

In the embodiment of FIG. 10, the secondary audio server 6 may refill the buffer with one or more media events from the secondary playlist 63, thus drawing media events from the secondary file server 7. For example, song a may be added to the buffer, and, if necessary, stretched (or squeezed) to fill the airtime that would have been filled by advertisement C. Alternatively, songs α and β (or other media events from play list 63) may both be added to the buffer (not shown), and squeezed to fill the airtime. Those skilled in the art will recognize that songs D, E, . . . may also be squeezed or stretched as may be appropriate to accommodate media events from the secondary play list 63, and that additional buffered media events may be removed from or used to fill the airtime as the case may be if, for example, such squeezing and/or stretching of songs D, E, . . . is inappropriate. Additionally, those skilled in the art will recognize that media events from the secondary play list 63 may be added to the buffer to supplement any part of the broadcast 62, including supplementation immediately after song B.

Also, if during broadcast the amount of buffered media becomes inadequate to meet airtime fill requirements, the secondary playlist 63 may be played until the buffer requirements are once again met. For example, if the buffer has less than 15 seconds of media event play time stored, the secondary playlist 63 may be played until some threshold buffer requirement is met. Alternatively, if the primary playlist 61 is exhausted, the secondary audio server 6 may switch back to broadcasting the secondary playlist 63.

Figure 11:
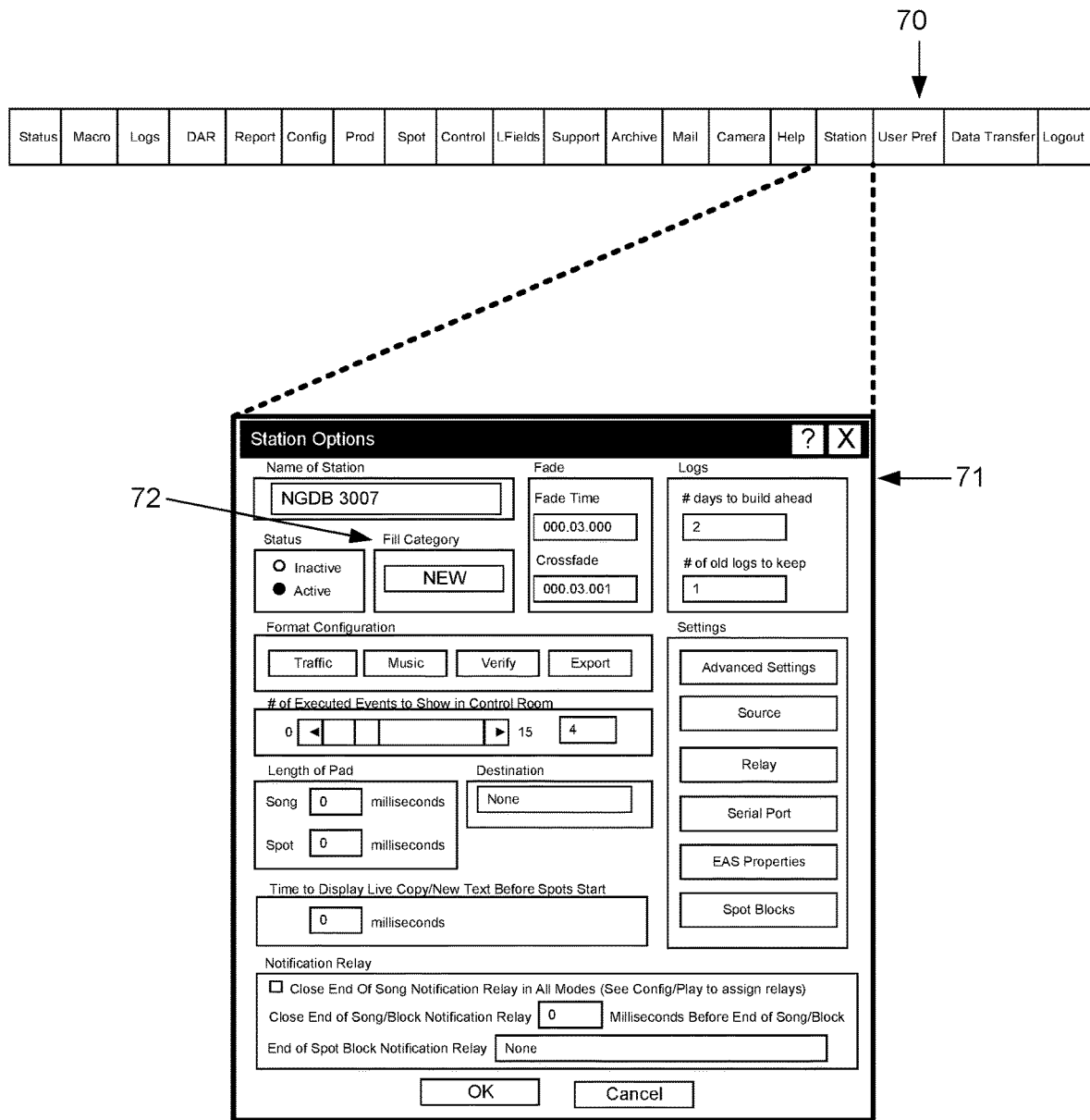
FIG. 11 depicts an embodiment of a user interface provided by broadcast automation software for establishing a fill category for a broadcast station.

If the secondary playlist 63 is also exhausted, the secondary audio server 6 may play filler material established as appropriate for that station. In the embodiment of FIG. 11, for example, the broadcast automation software may allow a user to create a category of songs that may be used to fill gaps in airtime. The user may do so by accessing the configuration menu 70 of the exemplary broadcast automation software installed on the secondary workstation 5, and selecting the "station" option to bring up an interactive dialog box 71 that allows the user to change the fill category 72. The category of fill media events selected may be valid for that station, e.g., "R&B" filler material for an "R&B" station format. Those skilled in the art will appreciate that a secondary play list is not required, and that random filler material may just as easily be used.

Those skilled in the art will recognize that the transition between media events of the secondary playlist and media events of the primary playlist may be defined in a manner noted above. For example, the last media event played from the secondary playlist may cross fade into the first media event played from the primary playlist. In the embodiment of FIG. 4, for example, a user may establish the rotation 34 to play immediately before transitioning from the primary play list to the secondary playlist, and may establish the rotation 35 to play in transitioning from the secondary playlist to the primary playlist. In the embodiment of FIG. 4, the user has established "intros" to segue into a media event from the secondary play list and "outros" to segue out of that media event.

In one embodiment, the broadcast automation software installed on the secondary workstation may provide an indication to the user of the status of the secondary audio server's buffer, such as how full the buffer is, which portion of the primary playlist is stored in the buffer, the types of media events stored in the buffer and the like. The broadcast automation software may also allow a user to 'jump ahead" in the buffer to, for example, skip portions of the playlist. The broadcast automation software may allow a user to rearrange the portions of the play list stored in the buffer. Thus, the play list does not necessarily have to be played from the buffer on a first-in first-out basis. Additionally, the broadcast automation software may allow a user to "dump" buffered media events into a media events log of the secondary station, and update the playback times in that media events log based on the buffer information. Furthermore, those skilled in the art will recognize that the secondary audio server 6 may output more than one stream from buffer 51, and may separately manipulate those streams as discussed herein. For example, one stream may be entirely advertisement free, and another stream may have advertisements inserted from a secondary play list.

Figure 12:
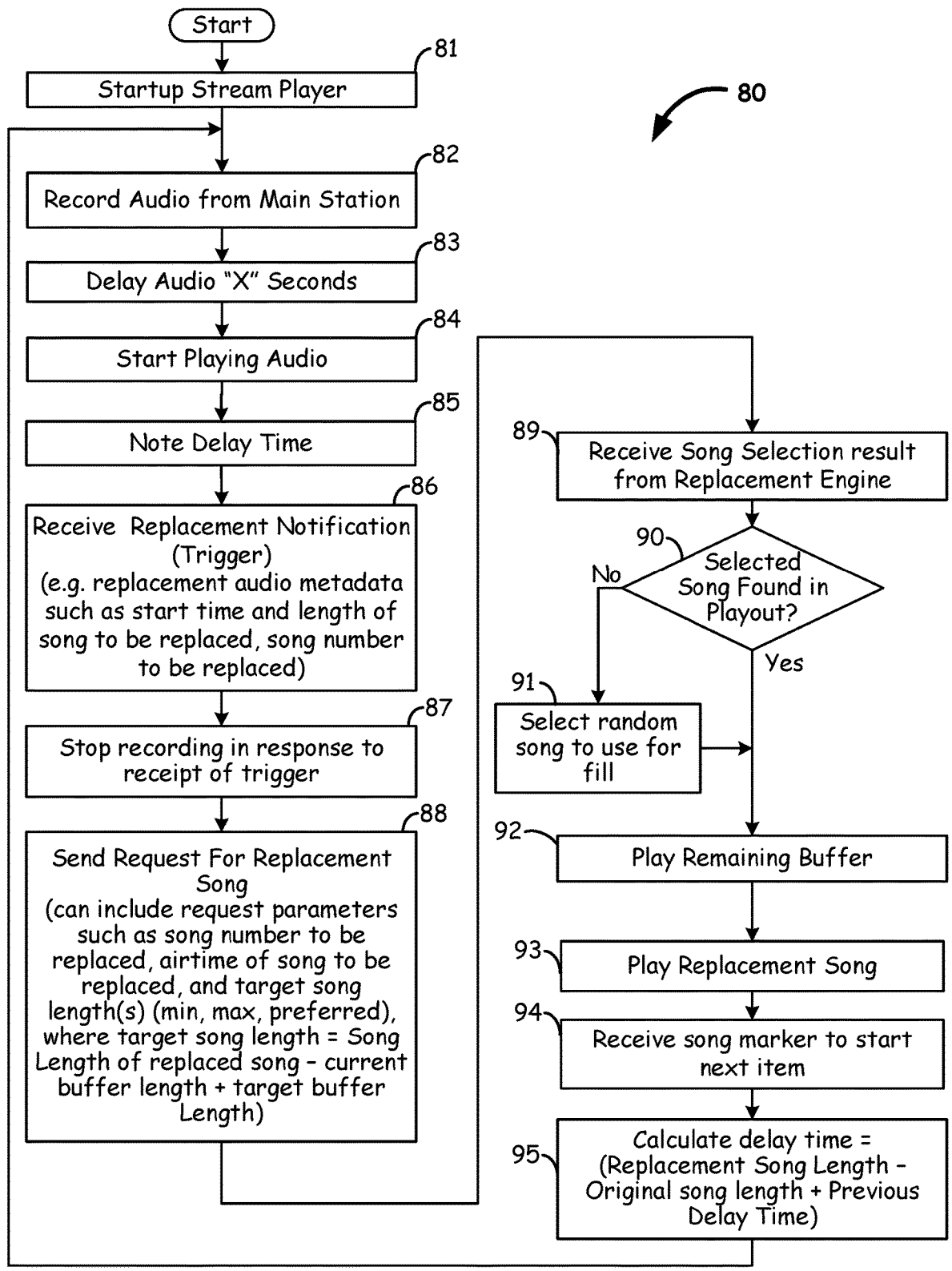
FIG. 12 depicts an embodiment of method of replacing, in a downstream radio station, a song from a main radio station that would otherwise be played-out by the downstream radio station, using a variable buffer.
Figure 13:
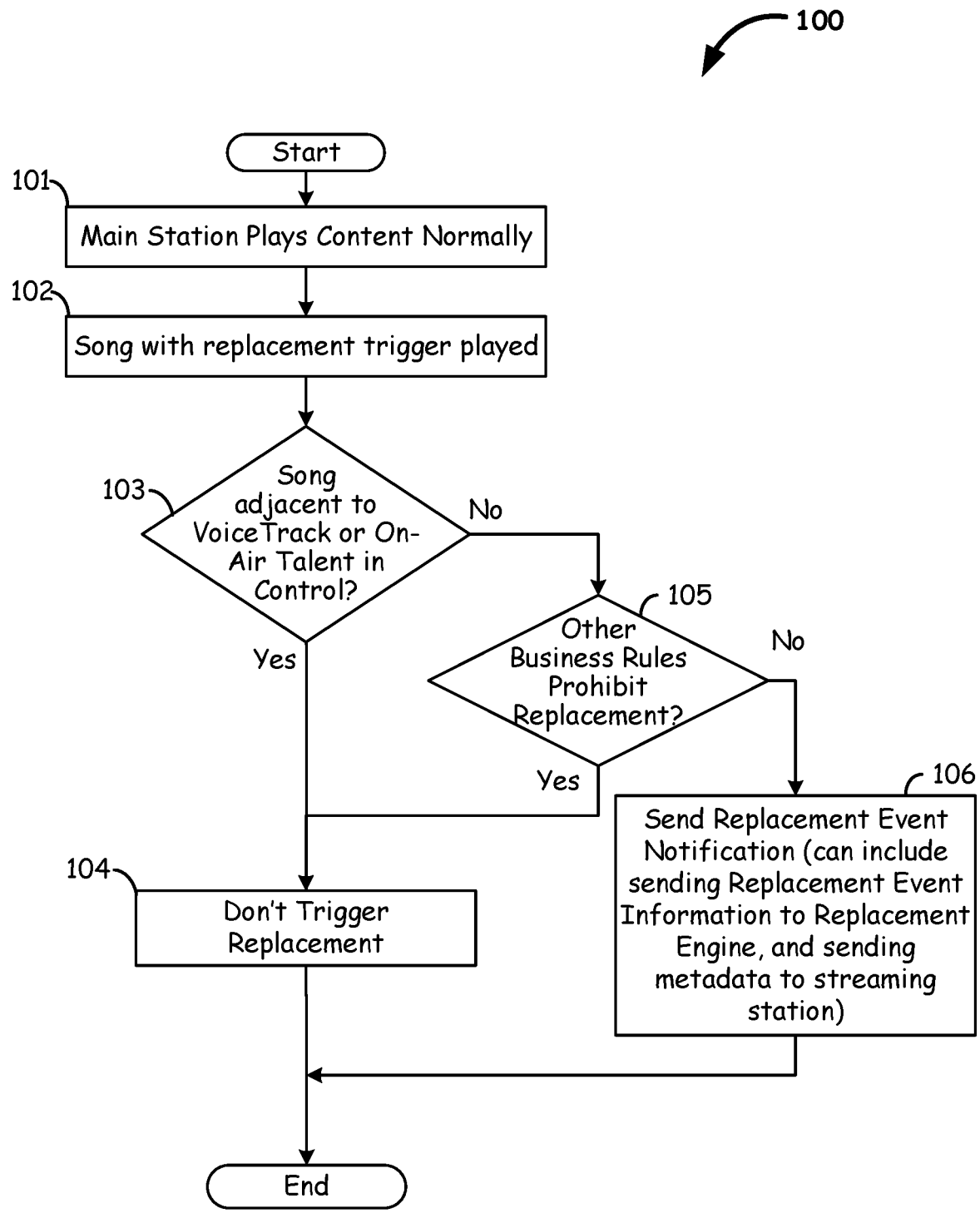
FIG. 13 depicts an embodiment of a method in which a main radio station determines whether a song being played out is to be replaced by a downstream radio station.
Figure 14:
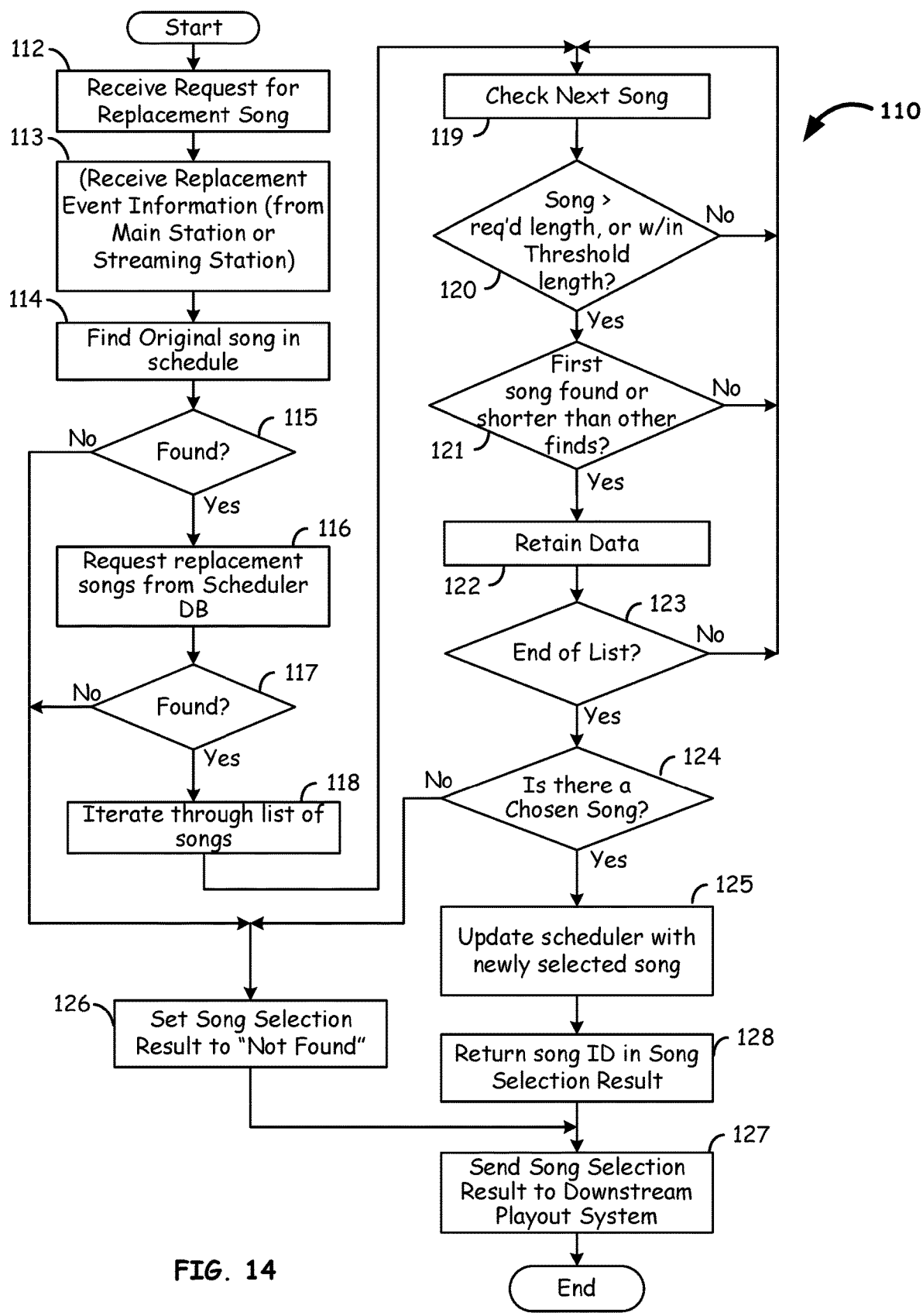
FIG. 14 depicts an embodiment of a method in which a replacement song is selected for substitution on a downstream radio station is selected.

Referring next to FIGS. 12-14, various methods of playing-out a replacement song on a downstream radio station that otherwise streams content from a main radio station, will be discussed. In general, the methods illustrated in FIGS. 12-14 allow a downstream radio station to play-out songs from a main radio station, replace an individual song being played out by the main radio station with a replacement song, and then resume playing-out songs from the main radio station, even if the replacement song has a substantially different length than the song from the main station being replaced. The methods illustrated in FIGS. 12-14 can be implemented using broadcast stations X and Y (see FIG. 1). In at least one embodiment, the method illustrated in FIG. 13 can be implemented by broadcast station X, while the methods illustrated in FIGS. 12 and 14 are implemented in broadcast station Y. In other embodiments, various procedures described in FIGS. 12-14 can be implemented on a single machine or server instance, or divided across various machines, servers, and the like. In some embodiments, the functionality described in FIGS. 12-14 can be implemented as software modules that can be executed by one or more local or distributed machines.

Referring next to FIG. 12, a method 80 will be discussed according to various embodiments of the present disclosure. Method 80 begins at block 81, which illustrates a downstream radio station or stream player starting up. The stream player is generally configured to play-out audio content from a main radio station, but as will be described subsequently, individual song items played on the main radio station can be replaced at the stream player, even if those individual replacement song items have a substantially different length than the song being replaced As illustrated at block 82, audio from the main station is being recorded. Note that although audio is used in the description of the various embodiments, the teachings herein can also be adapted for use with video or audio/video content without departing from the spirit and scope of the disclosure. The audio being recorded from the main station can include commercial spots, songs, voice tracks, and similar content typically provided by digital, analog, standard, and high definition radio stations used to broadcast, streaming, or otherwise provide content over the air or the Internet. As illustrated by block 83, the audio being recorded from the main station is delayed by "X" seconds. The combination of block 82 and 83 can be considered to be a buffer. The buffer delay can be initially set to a target buffer delay, as desired, but in general will include at least enough delay to facilitate substitution of songs having a generally anticipated length. In some embodiments, a variable buffer delay in the range of 30-120 seconds is used. The target delay can be set in 15 second increments, although other increments and granularities can be used. The delay "X" at block 83, is variable, and changes over time based on a delay calculated after song substitution, as described subsequently. In various embodiments, the audio delay of "X" seconds illustrated by block 83 is an actual buffer delay, as opposed to an ideal, or target buffer delay.

After the audio being record from the main station at block 82 is delayed at block 83, the downstream radio station begins playing-out the buffered audio at block 84. The buffer delay time is noted at block 85, for future use in recalculating a current delay time, selecting appropriate replacement songs, and the like.

As illustrated at block 86, during the time that the downstream radio station is playing audio from the main station, a replacement notification is received at block 86, indicating that a song scheduled to be played on the main station is to be replaced on the downstream station. In various embodiments, the replacement notification can be received from the same main station whose audio is being recorded at block 82, and includes, but is not limited to, replacement audio metadata, such as a start time, a length of a song to be replaced, and/or a song number (or other identifier) of the song to be replaced. The song number, or other identifier, allows the downstream radio station to obtain additional information about the song from various song databases, schedule generation systems, or the like as necessary or desired. Generation of the replacement notification will be discussed in more detail with respect to FIG. 13, but in general the replacement notification serves as a trigger that indicates to the downstream media player that it should stop recording the audio from the main station, as illustrated in block 87, and begin the substitution process.

As just noted, in at least one embodiment, recording of audio from main station stops at the time that the replacement notification is received. After the recording of the audio from the main station is stopped, as illustrated by block 87, the downstream radio station sends a request for a replacement song, as illustrated by block 88. The request can be sent to a replacement engine, module, server, or the like, and can include various parameters such as the song number of the song to be replaced, the airtime of the song to be replaced, a minimum song length, a maximum song length, a desired song length, and the like.

The downstream radio station can determine a minimum required song length by subtracting the current buffer length "X" from the length of the song to be replaced, and then adding a target buffer length. Thus, for example, if a song to be replaced is 3 min. long, the current buffer length is 30 seconds, and the target buffer length is 15 seconds, the minimum length song requested will be 2 min. and 45 seconds=3 min.−30 seconds+15 seconds. the minimum song length can be provided as a parameter to a replacement engine to allow the replacement engine to select an appropriate song. In some embodiments, the request for a replacement song can include the data necessary for the replacement engine to calculate the minimum song length. Furthermore, in some embodiments a song identifier, such as the number of the song to be replaced or some other song identifier, is sent to the replacement engine along with the request for replacement song.

Sending information about the song to be replaced to the replacement engine allows the replacement engine to perform a targeted song selection. The targeted song selection can also take into account user preferences and parameters if available, as well as various song selection criteria that may be implemented on a station by station basis for each individual downstream station from the main station, on a geographic basis, on a per-user basis, on a group identity basis, or the like. In some embodiments the same selection criteria can be used for substantially all of the downstream radio stations playing out content from any particular main radio station. The replacement engine can be implemented as a software module executed by the same processor or processing circuitry implementing the downstream radio station. Alternatively, the replacement engine can be implemented as a standalone process procedure on an entirely different machine than that being used to implement the downstream radio station. Less or more information can be sent along with the request for a replacement song, depending on how much information the replacement engine needs to make an informed selection, and on how much information the replacement engine can obtain about the song to be replaced from the main radio station or some other source. Furthermore, in some embodiments, the act of transmitting one or more pieces of information, as illustrated by block 88, implicitly serves as a request for replacement song, even though there is no explicit and separate stand-alone request.

As illustrated by block 89, the downstream radio player receives a song selection result from the replacement engine. The song selection result can either be a positive or negative result, indicating a selected song for substitution, or that the replacement engine has not found a replacement song. As illustrated by block 90, the song selection result is tested to determine whether the song selection result identifies a song available to the play out system of the downstream radio station. Note that in some embodiments, there are two ways for the decision at block 90 to return a negative result. First if the song selection result from the replacement engine identifies a song, but the identified song is not available to the downstream radio station's play out system, the result is negative. Second, if the song selection result from the replacement engine indicates that no replacement song has been found, the result will be negative. A positive result at block 90 will be returned if both of the following are satisfied: 1) a replacement song is identified in the song selection result; and 2) the identified song is available for play-out by the downstream system.

If block 90 returns a negative result, a random song can be selected and used for fill, as illustrated in block 91. In some embodiments, rather than simply selecting a random song, the downstream radio station can consult a list of filler songs, and select one of those filler songs based on the play out length of the filler song or some other suitable criterion or group of criteria.

Requesting a replacement song, receiving the song selection, and deciding whether to play a song identified in the song selection or to use a random filler song, are generally performed between the time recording of audio from the main station is stopped at block 87 and the time that the remaining buffer is played out at block 92. At the conclusion of block 92, in at least one embodiment, the buffer storing recorded audio from the main station is empty prior to play-out of the replacement song at block 93.

As illustrated by block 94, a song marker is received, indicating to the downstream radio station that buffering of the audio content from the main station is to be resumed. This marker should generally be received at a time prior to completing play-out of the replacement song, and can be received in the normal course of obtaining content from the main radio station. In other embodiments, the main station can transmit extra metadata, or a standalone marker or start trigger, to the downstream station.

In at least one embodiment, in response to receiving the song marker, a delay time is recalculated and recording of audio from the main station begins again at block 82. The new delay time calculated at block 95 can be determined by subtracting the replacement song length from the original song length and adding the previous buffer delay time. For example, if the previous delay time "X" in block 83, which serves as the current delay time until the delay time recalculation is complete, was 30 seconds, the original song length was 3 min., and the replacement song length was 3 min. and 10 seconds, the recalculated delay time at block 95 will be 180 seconds (original song length)−180 seconds (replacement song length)+30 seconds (buffer delay), which results in a calculated new buffer delay time of 20 seconds. From this example, it can be observed that the buffer delay in which audio from the main station is recorded has decreased by 10 seconds, from 30 seconds to 20 seconds, leaving a 20 second delay for use in performing another song replacement at a subsequent time. Additional song replacements can be performed, and with each such replacement the buffer delay can be varied to accommodate differences between an original song and a replacement song. Although not specifically illustrated, if the newly calculated buffer delay time is negative, or below a target threshold, the current replacement song can be faded out to facilitate reintegrating the main station's audio into the downstream radio station's stream.

Referring next to FIG. 13, a method 100 will be illustrated and discussed according to various embodiments of the present disclosure. At block 101 a main station plays content normally. As noted previously the audio content played by the main radio station is also streamed, or otherwise played-out, at a downstream radio station. During normal play-out of content, a song replacement trigger is encountered at block 102. The replacement trigger indicates that a song associated with the trigger is a candidate for replacement, although every song associated with a replacement trigger will not necessarily be replaced. The replacement trigger can be implemented by a replacement trigger included within a song, by a replacement trigger included within the metadata associated with the song, or received from external to the main radio station in response to satisfaction of any of various business rules, preferences, or the like.

In response to the main radio station encountering the song replacement trigger, a decision is made at block 103 to determine whether the song associated with the replacement trigger is adjacent to a voice track, and whether on air talent is in control of the content being played out by the main radio station, even if the song is not adjacent to a voice track. This check is made in at least some embodiments, because there is an increased likelihood that a voice track being played adjacent to a song with the replacement trigger will refer to the song. It is generally undesirable to play a voice track that refers to a song, and not also play the song, because listeners could become confused or frustrated, thereby negatively impacting the listener experience. Thus, if it is determined at block 103 that the song to be replaced is adjacent to a voice track, or that on air talent is in control of the content being played out by main radio station, method 100 proceeds to block 104 and replacement of the song is not triggered, or is suppressed. Voice tracks, live audio items, and station identifiers are examples of interstitial audio items, and although the term "voice tracks" is used herein for convenience, any reference to voice tracks is intended to include other interstitial audio items, unless the context clearly indicates otherwise.

If it is determined at block 103 that the song to be replaced is not adjacent to a voice track, and that on-air talent is not controlling, another decision is made at block 105 to determine whether other business rules might prohibit replacement of the song. Other business rules can include, but are not limited to, decisions regarding royalty payments, user preferences, advertiser requirements that an advertisement be played adjacent to a particular song, or the like. If other business rules prohibit replacement of the song, method 100 proceeds again the block 104 where replacement of the song is not triggered, or where replacement of the song is inhibited. If other business rules do not prohibit replacement of the song, as determined at block 105, the method 100 proceeds to block 106, where a replacement event notification is sent to one or both of a downstream radio station and a replacement engine. The replacement event notification can include metadata, such as a song identifier, or a song length, category, or the like, which can be used to inform replacement song selection decisions.

Referring next to FIG. 14, a method 110 will be discussed according to various embodiments of the present disclosure. At block 112 the replacement engine receives a request for replacement of the song. At block 113 the replacement engine receives replacement event information. The replacement event information can include a request to select a replacement song, and can come from either a main radio station playing out a song that is to be replaced, or from a downstream radio station, on which the replacement song is to be played. The replacement event information can include song length information related to a desired song length, a minimum song length, a length of a song to be replaced, metadata associated with a song to be replaced, a song identifier, station or market preferences, genre information, ranking information, replacement history information, and/or other information that can be used to make song selection decisions.

As illustrated at block 114, a check is made to determine whether the replacement engine can find the original song, i.e. the song to be replaced, in the schedule. As illustrated at block 115, if the song to be replaced cannot be found in the schedule, method 110 proceeds to block 126, which illustrates setting the song selection result to not found. A song selection result of "not found" is then delivered to the downstream play out system at block 127.

If the original song is found in the schedule at block 115, method 110 proceeds to block 116, which illustrates requesting replacement songs from scheduler database. The request for replacement songs can include song parameters, such as song category, genre, or the like, such that only desired types of songs will be returned from the scheduler database. In at least some embodiments, the songs requested from the scheduler database are requested to be of a different category than the song being replaced. Thus, for example, if a hard rock song is being played on the main station, the replacement engine may request classic rock songs to be returned from the scheduler database. The request for replacement songs at block 116 can also include various parameters such as song length, the number of songs requested, and the like. In other embodiments, the replacement engine can request specific song titles or classifications from the scheduler database.

At block 117, a check is made to see whether any songs are returned from the scheduler database request. If not, method 110 proceeds again to block 126, where the song selection result is set to not found, and the song selection result is delivered to the downstream play out system at block 127. If, however, the request for replacement songs at block 116 results in the scheduler database returning one or more songs, the method proceeds to block 118, where the replacement engine iterates through the list of songs returned from the scheduler database.

At block 119, a song is retrieved from the list to be evaluated. At block 120, the song being evaluated is checked to determine whether it meets a minimum length requirement, or whether the song is within a threshold length, either or both of which can be specified in the event information or received along with the request for replacement song. If the song being evaluated does not meet the minimum length requirements (or threshold requirements) the method returns to block 119 where the next song in the list is selected for evaluation.

If the song being evaluated meets the minimum (or threshold) length requirements, method 110 proceeds to block 121, where a determination is made about whether the currently evaluated song is either: 1) the first song found to meet the threshold length requirement; or 2) shorter than any other previous songs identified as meeting the minimum (or threshold) length requirement. Thus, a positive result at block 121 means that the shortest song meeting the minimum length requirement is carried through to block 122, where data regarding that song is retained for later use, and possible transmission to a downstream radio station or play-out system. At block 121, if the song being evaluated is not the first song found, and is not shorter than any other previous song found, method 110 returns to block 119 where the next song list is checked.

At block 123 a check is made to determine if each of the songs in the list of songs has been evaluated. If the end of the list has not been reached method 110 returns to block 119, and subsequent songs continue to be evaluated until the end of the list is reached. Once the end of the list is reached, as determined at block 123, method 110 proceeds to block 124, where a check is made to see if a song has been chosen. If no song has satisfied the length criteria, the method 110 proceeds to block 126 where the song selection result is set to "not found" and sent to the downstream play out system at block 127.

If a song has been chosen, the scheduler is updated with the newly selected song at block 125. As shown by block 128, a song identifier of the selected song is entered into the selection result. At block 127 a song selection result including the song identifier is sent to the downstream play-out system. Thus, the song selection result sent to the downstream play out system will indicate whether no song has been found, or will indicate which song has been selected by the replacement engine.

Some or all of systems, elements and techniques related to selecting replacement media items, along with other systems, elements and techniques disclosed previously herein, can be used in combination with the disclosure discussed below with respect to FIGS. 15-19 for scheduling advertising during restricted shows.

Figure 15:
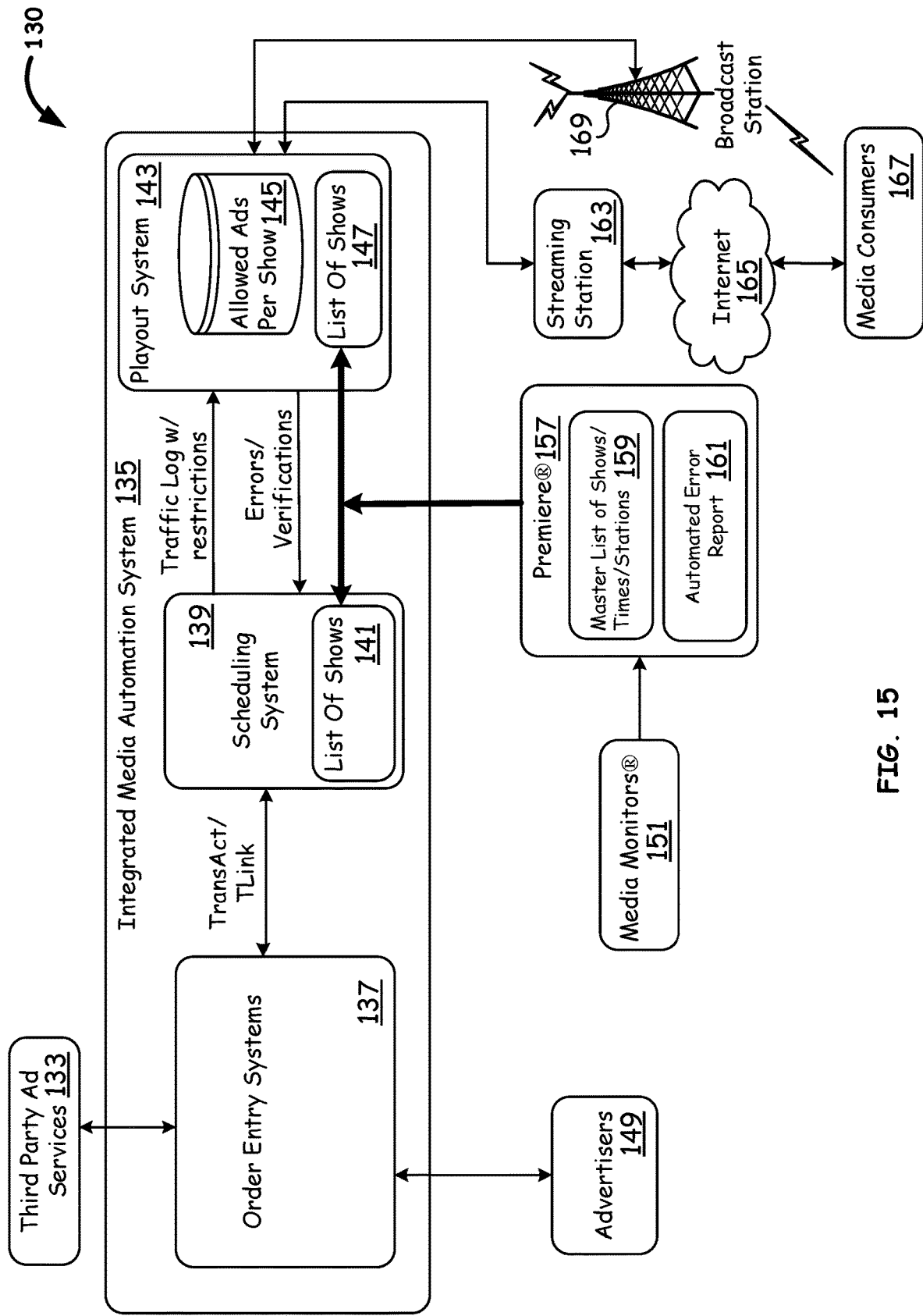
FIG. 15 depicts a system configured to prevent advertisements from particular advertisers from being aired during restricted shows, according to various embodiments of the present disclosure.

FIG. 15 depicts an embodiment of a system 130 configured to prevent advertisements from particular advertisers from being aired during restricted shows, according to various embodiments of the present disclosure. System 130 includes integrated media automation system 135, third party ad services 133, advertisers 149, media monitors 151, Premiere® 157, streaming station 163, broadcast station 169, Internet 165, and media consumers 167.

Integrated media automation system 135 includes order entry systems 137, scheduling system 139, and playout system 143. Order entry systems 137 can work in conjunction with scheduling system 139 to allow advertisers or other entities to view available media inventory, to select one or more media items as restricted shows, and to prohibit advertiser content from being scheduled or aired during a restricted show. In some embodiments, an advertiser is presented a list of shows already designated as restricted shows, while in other embodiments a customer can designate one of the media items in the available inventory as a restricted show. Order entry systems 137 can tag customer records to reflect the prohibition against advertisements being placed during a restricted show.

Order entry systems 137 can transmit advertising orders, and information associated with advertising orders, to scheduling system 139 via a TransAct® TLink. The information associated with advertising orders can include a list of advertisers that have requested their advertisements not to be scheduled during restricted shows, advertisements to be scheduled, and the like. In at least one embodiment, the flags associated with show restrictions are transmitted in conjunction with advertising orders.

Scheduling system 139 can be used to generate broadcast logs, sometimes referred to as traffic logs, for one or more playout systems. A broadcast log includes a completed schedule for a given period of time such as an hour, or a daypart, and specifies particular media items to be played out during particular portions of the given period. For example, a broadcast log can specify that a given song will be aired from 8:00 am to 8:03:52, a specified cola advertisement from 8:03:52 to 8:04:31, a particular car advertisement from 8:04:31 to 8:06:02, a first portion of a given show from 8:06:02 to 8:15:00, a predetermined public service announcement from 8:15:00 to 8:15:30, a particular computer advertisement from 8:15:30 to 8:16:42, a specific beverage advertisement from 8:16:42 to 8:18:04, a second portion of the show from 8:18:04 to 8:30:00, and so on.

Scheduling system 139 can use list of shows 141 and information available from various scheduling system databases to determine which shows or other media items to include in the broadcast log. Generally, scheduling system 139 uses information from a master or station clock to determine which types of media to place in which positions of the log, and where in the log to place advertisements. The general use of rule-based systems to select media items for inclusion in a broadcast log is generally known to those of ordinary skill in the art. Advertisements are typically placed in spot blocks pre-assigned to particular times in the master or station clock.

The term spot block, as used herein, refers to a portion of time in the clock reserved for placement of one or more advertisements or advertising content items. Thus, a broadcast log includes one or more advertisements scheduled to be played during an empty spot block included in a clock. In general, scheduling system 139 can place advertisements according to a preferred set of advertising rules, except that in various embodiments described herein, even if advertisements from certain advertisers would have otherwise been selected by the set of advertising rules, placement of those advertisements can be prohibited from being placed in spot blocks during restricted shows. In some embodiments, the prohibition can be on a per-advertiser basis—without requiring the advertiser to specify particular advertisements to prohibit. In other embodiments, the prohibition can be on a per-advertisement basis, so that an advertiser can allow one advertisement to be aired during a restricted show, but prohibit a different advertisement from being aired during that same restricted show. Various combinations of per-advertiser and per-advertisement prohibitions can also be used. Furthermore, different restriction bases can be automatically implemented, so that time-consuming manual alteration of automatically generated broadcast logs is not needed to comply with advertiser restrictions or prohibitions regarding restricted shows.

To further explain placement of advertisements subject to advertiser prohibitions, consider a case where a show included in a broadcast log is a restricted show, and ABC123 computer manufacturer wants to prohibit any of its advertisements from being aired during the restricted show. Even if the advertising rules used by scheduling system 139 would otherwise result in an advertisement for ABC123 computer manufacturer being selected for inclusion in the broadcast log during the restricted show, that advertisement would not be scheduled. Instead, a non-prohibited advertisement would be schedule in place advertisement for ABC123 computer manufacturer. Similarly, if ABC123 computer manufacturer wanted to prohibit a particular advertisement from being scheduled to air during the restricted show, that particular advertisement would not be selected for inclusion in a spot break occurring during the prohibited show, but other advertisements from ABC123 computer manufacturer would not be prohibited.

Advertisements to be considered for inclusion in the broadcast log can be obtained from order entry system 137, from third party ad services 133, or from some other suitable source, such as an advertisement database (not illustrated) available to scheduling system 139. Additionally, scheduling system 139 can use a list of shows 141, which can be obtained from Premiere® 157, to assist in scheduling items to be included in the broadcast log. List of shows 141 can include information about shows to be aired, times the shows are scheduled to be aired, and the stations on which those shows are to be aired. In some embodiments, list of shows 141 includes a list of shows, times, and stations for multiple playout systems (not illustrated).

In various embodiments, shows, spot breaks, spots, and/or other items within the broadcast log can be flagged or marked with restrictions including, for example, a blackout attribute. The flag or other information indicating a restriction or blackout attribute can be included in metadata belonging to the media item itself, or included in the broadcast log and its associated information and metadata. In at least one embodiment, scheduling system 139 can send a broadcast log including information about prohibitions, blackouts, or other restrictions related to restricted shows to playout system 143. Playout system 143 performs a verification check on the broadcast log, catalogs "allowed spots per show," passes show restriction information to one or more order entry systems, e.g. AdsWizz, in metadata, and sends error and/or verification messages back to scheduling system 139. An error message and a verification message can be a single message in some embodiments, while in other different messages are used to transmit error information and verification information.

An example of an error that may be reported by playout system 143 is improperly scheduling an advertisement from an advertiser in the list of advertisers who have prohibited advertisement placement in a spot break occurring during or near to a restricted show. Playout system 143 can perform the verification, in whole or in part, based on any or all of the following: information included in allowed-ads-per-show database 145; information included in list of shows 147; restriction information received in conjunction with the broadcast log; and information available to playout system 143 from other sources or locations, such as from order entry system 137, or the like.

The allowed-ads-per-show database 145 can include, among other things, information that identifies a pool of advertisements from which advertisements for a particular show can be chosen. This information can be obtained from third party ad services 133, from another database or service implemented as part of integrated media automation system 135, or from another suitable source. In some embodiments, instead of an allowed-ads-per-show database 145, a prohibited-ads-per-show database (not illustrated) can be included in playout system 143 and used to perform verifications or advertisement replacement.

Playout system 143 can provide output to one or many different stations, such as broadcast station 169, which broadcasts media content to media consumers 167 using radio frequency (RF) modulated transmissions; and streaming station 163, which can transmit media content to media consumers 167 via a network such as Internet 165 using, for example packet switched encoding techniques. Although not specifically illustrated, playout system 143 can itself use the Internet 165 or another suitable communications network for transmitting information to, and receiving information from, broadcast station 169 and streaming station 163.

In some embodiments, system 130 includes, or provides access to, Premiere® 157 and Media Monitors 151. Media monitors 151 monitors actual playout of shows, advertisements, and other media items on multiple media stations. In at least one embodiment, Media monitors 151 has access to schedules for the monitored stations, so that a comparison can be made between media items that were scheduled for playout and media items that were actually played out on each monitored station. Differences between scheduled playouts and actual playouts can be reported to Premiere® 157. In other embodiments, Media monitors 151 can report actual playouts to Premiere® 157, in place of or in addition to differences between scheduled and actual playouts.

Premiere® 157 can maintain, or obtain access to, a master list 159 of shows, times, and stations from scheduling system 139. In some embodiments, master list 159 can include information from more than one scheduling system 139. Premiere® can use information obtained from media monitors 151 and master list 159 to generate list of shows 141 and 147. Additionally, Premiere® 157 can also generate automated error reports 161. In some embodiments automated error reports can include information about prohibited advertisements that were improperly aired during a restricted show, during a buffer around a restricted show, and during periods of time designated as blackout periods.

Figure 16:
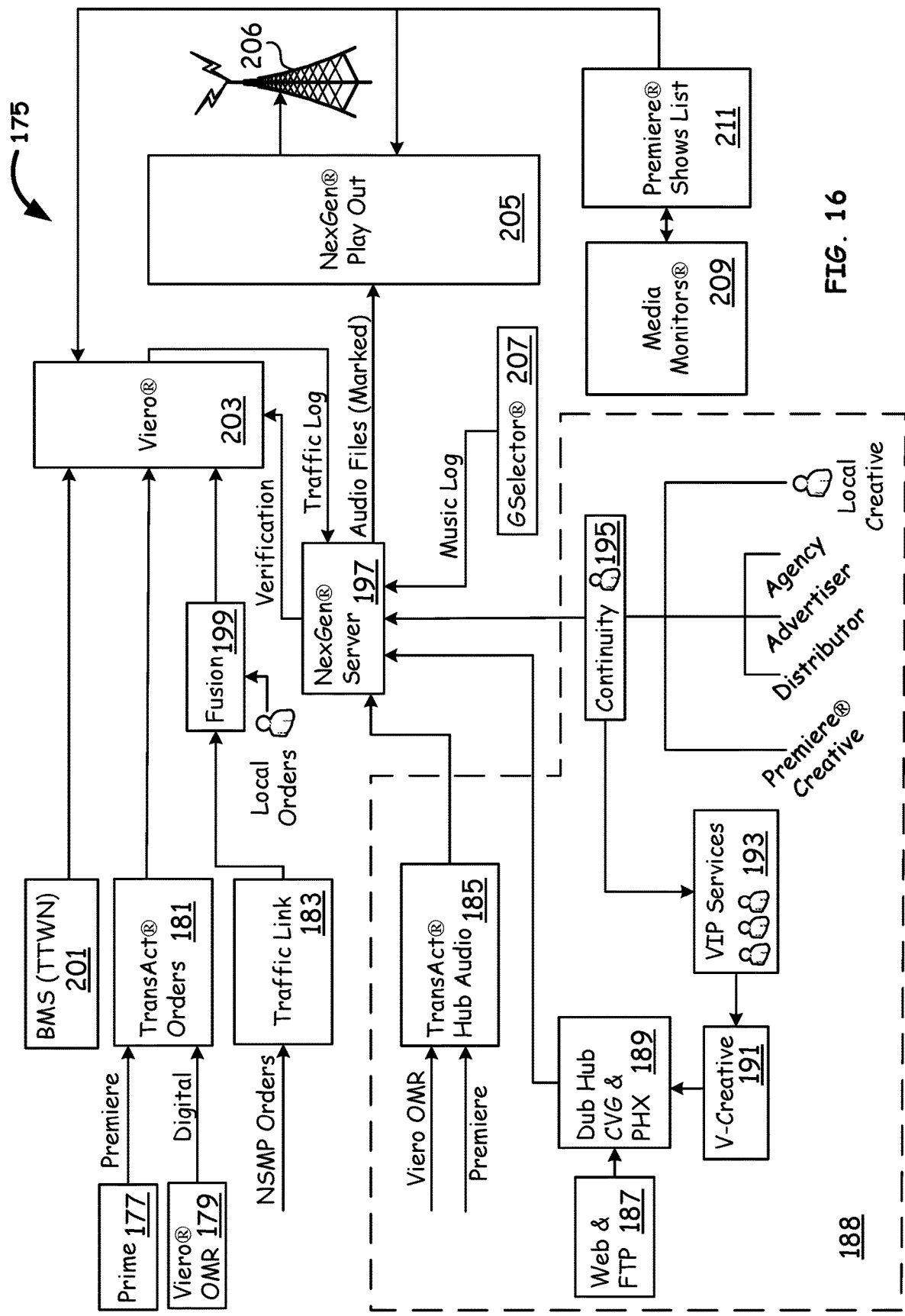
FIG. 16 depicts another embodiment of an integrated media automation system configured to restrict advertisements from particular advertisers from being aired during restricted shows, according to various embodiments of the present disclosure.

Referring next to FIG. 16, integrated media automation system 175, which is configured to restrict advertisements from particular advertisers from being aired during restricted shows, is discussed according to various embodiments of the present disclosure. Although FIG. 16 illustrates a specific implementation that uses particular modules, servers, and components arranged in a particular order, various embodiments of the claimed invention can employ modifications including use of fewer, additional, or different components, servers, and modules.

FIG. 16 flows generally from the left side, where media orders are received, to the right side, where media orders are completed by airing advertising content during spot breaks included in a broadcast schedule. Advertising orders can be received from various sources, for example Prime 177 and Viero® OMR 179, using various order entry systems including TransAct® 181, Traffic Link 183, and BMS (TTWN) (broadcaster marketing system—Total Traffic and Weather Network) 201. The orders received via BMS (TTWN) 201 can be transmitted directly to Viero® 203, while Network Mobility Services Protocol (NMSP) orders received via TransAct® 181 and Traffic Link 183 can be delivered to Fusion® 199, which in turn sends orders to Viero® 203. Viero® 203 generates a traffic log, also referred to herein as a broadcast log, as discussed previously with reference to FIG. 15.

Viero® 203 sends the traffic log to NexGen server 197, which obtains content from content receipt modules and subsystems 188, obtains a music log from GSelector 207, verifies the Traffic Log, and sends marked media files to NexGen Playout 205. NexGen Playout 205 plays out the media files obtained from NexGen Server 197 to broadcast station 206. Media Monitor's 209 and Premiere® shows list 211 cooperate to monitor played out media files, determine inconsistencies between scheduled media items and actually played-out media items, and to provide monitoring reports to NexGen playout 205 and Viero® 203.

Also illustrated in FIG. 16 are various content receipt modules and subsystems 188, through which content to be included in broadcast logs is received. Content receipt modules and subsystems 188 includes Dub Hub CVG & PHX 189, which receives content from Web & FTP 187 and V-Creative 191. V-Creative 191 receives content from VIP services 193, which in turn receives content from continuity module 195. Continuity module 195 can obtain content from Premiere® Creative, Distributors Advertisers, Agencies, and Local Creative services. Content receipt modules and subsystems 188 are illustrated for completeness, and are not discussed in further detail.

Order entry systems TransAct® 181, Traffic Link 183, and BMS (TTWN) 201 can add flags or other information to order records, advertiser records, or other records to provide blackout indicators that specify whether or not advertisements in the order have been explicitly permitted or prohibited from being played out during restricted shows. In some embodiments, a default blackout indicator can be assigned to orders for which no preference for inclusion or prohibition is specified. In some embodiments, if the default is set to allow, at least some advertisements in the order will be able to be assigned to spot breaks occurring during or near a restricted show. If the default is set to prohibit, at least some advertisements in the order will be prohibited from being scheduled in spot breaks occurring during or near a restricted show.

The blackout indicators can, in various embodiments, apply to the order, the advertiser, to particular advertisements, or to some combination of these. Multiple flags or blackout indicators can also be used, so that one or more flags is dedicated to a restricted status of the order, one or more flags is dedicated to a restricted status of the advertiser, ad one or more flags is dedicated to a restricted status of particular advertisements. Additionally, the blackout indicators can be applied to either a single show, or to a group of shows. For example, a particular order may have multiple blackout indicators or flags specifying that advertisements in the order should be prohibited from one particular show, but not from other shows.

In some cases, one or more blackout indicators can specify that one or more advertisements in the order are prohibited from being played in all shows designated as restricted, or in a particular subset of restricted shows. Various combinations of flags and other information can be included in each order so that, for example, one advertisement is prohibited from being scheduled during a first restricted show, another advertisement is prohibited from being scheduled during a second restricted show, but not the first restricted show, and all other advertisements from an advertiser are prohibited from being scheduled during a third restricted show, but are allowed during the first and second restricted show. Various other combinations are also possible.

Figure 17:
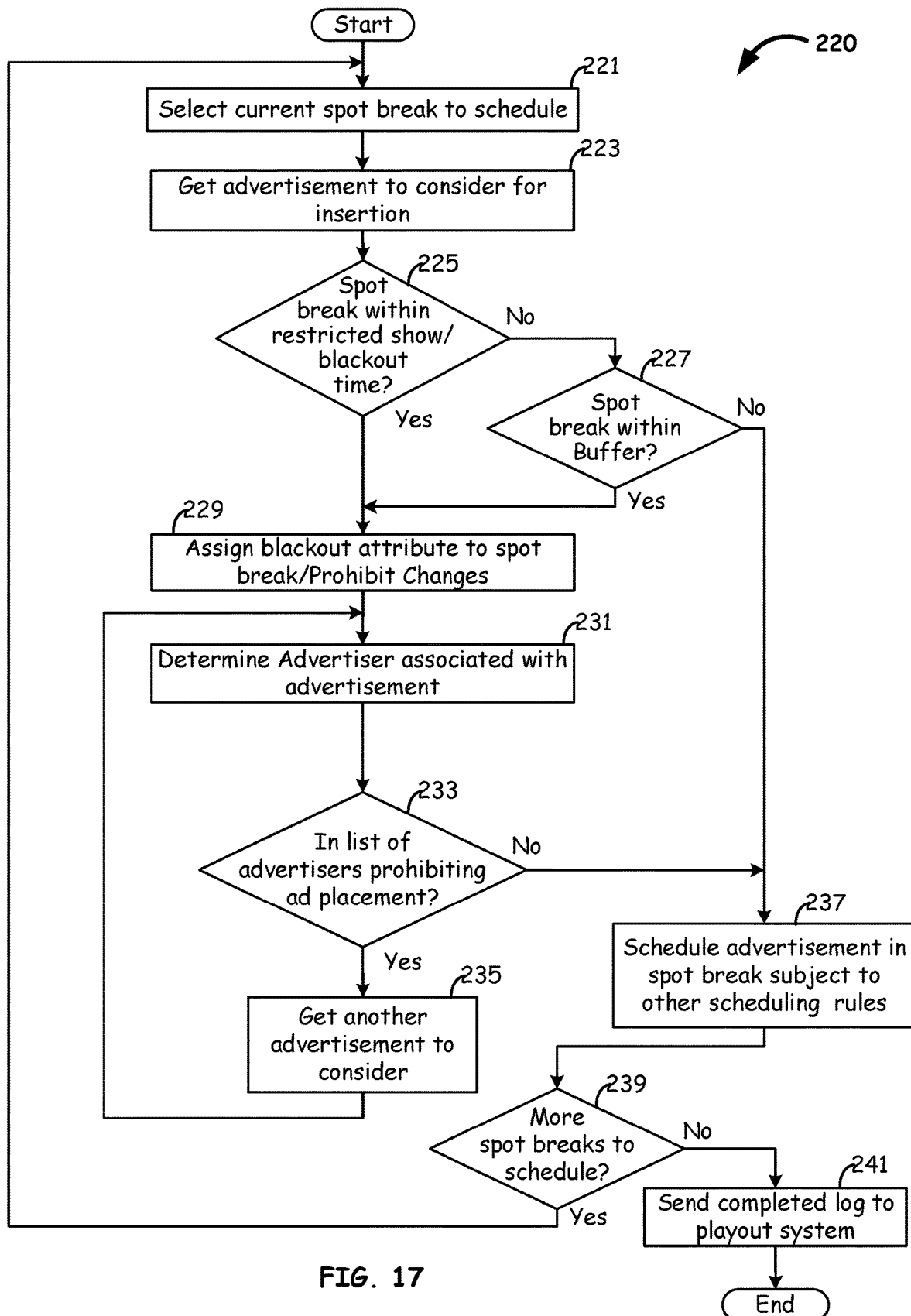
FIG. 17 is a flowchart illustrating a method of preventing advertisements from particular advertisers from being aired during restricted shows, according to various embodiments of the present disclosure.

Referring next to FIG. 17, a method 220 of scheduling advertisements in spot breaks subject to restriction requirements is illustrated and discussed according to various embodiments of the present disclosure. In at least some embodiments, scheduling of shows and other primary media content has already been completed prior to beginning execution of method 220. At block 221, a current spot break to be scheduled is selected. In some embodiments, the spot breaks within a particular time period are scheduled in chronological order. For example, the first spot break in an hour is scheduled, then the next spot break in the hour is scheduled, and so on. In other embodiments, spot breaks within blackout periods or spot breaks having other special scheduling considerations can be scheduled first, followed by unrestricted spot breaks.

As shown by block 223, information about an advertisement to be considered for insertion or scheduling in the selected spot break is obtained. Note that the advertisement itself need not be retrieved, at this point, just information sufficient to make a decision about whether or not the advertisement will be scheduled in the current spot break. Thus, reference to obtaining the advertisement, unless otherwise required by context, need not include actually obtaining the media content.

As illustrated at block 225, a check is made to determine whether or not the spot break being scheduled is within a restricted show. The determination made at block 225 can be made based, at least in part on flags or blackout indicators associated with advertisers, advertisements, the spot break, the show or some combination of these. The blackout indicators can be included in, and obtained from, order records, advertiser records, advertisement records, a clock from which the broadcast log is being generated, a separate file including information about allowed or prohibited advertisements, or some combination thereof.

If it is determined at block 225 that the spot break is not within a restricted show, a check is made at block 227 to determine whether the spot break falls within a buffer around the restricted show. A spot block that is either within a restricted show, or within a buffer around a restricted show, is considered to be within a black out time. In some embodiments, the buffer around a restricted show is limited to spot breaks immediately preceding or following the restricted show. In other embodiments, the buffer is assigned a specific duration, between 0 and 30 minutes before and/or after a restricted show. Any spot break that includes a portion that falls within the buffer can be designated as being within a blackout time or blackout period. In some implementations, buffers are truncated at the beginning and/or end of specified time periods, such as hours, or days, or dayparts. Thus, a 30-minute buffer that would normally begin at 3:45 and end at 4:15 can be truncated to begin at 3:45 and end at 3:59. Similarly, a buffer period may be prohibited from crossing midnight, or from spanning across dayparts.

If the spot break is neither within a restricted show, nor within a buffer around the restricted show, the advertisement can be scheduled subject to "normal" advertisement placement rules, as illustrated by block 237. If the spot break is within a blackout time, a blackout attribute that prohibits later alteration of the content scheduled in the spot break can be assigned to the spot break. The blackout attribute can be a flag inserted into the broadcast log or metadata associated with the broadcast log, that prohibits later manual or automated changes to the flagged spot break. Thus, once an advertisement is selected for inclusion in the spot break, that spot break is flagged to prevent local stations from manually replacing that advertisement. Later replacement of the advertisement by automated scheduling software can also be prevented by including a blackout attribute in the broadcast log.

Beginning at block 231, the advertisement obtained at block 223 can be considered for placement. At block 231, an advertiser associated with the advertisement can be identified based on information included in an order record, an advertisement record, or the like. At block 233, a check is made to determine whether the identified advertiser is in a list of advertisers prohibiting placement of their advertisements in restricted shows. The list of advertisers can be pre-compiled, for example by an ordering system, or an advertiser's record can be inspected during the scheduling process to determine if that advertiser has place restrictions on its advertisements. In some embodiments, all advertisements associated with advertisers who have placed restrictions on their advertisements can have a flag included in the advertising record. In this way, a determination about whether or not an advertiser is in the list of advertisers can be made by inspecting the advertisement record, because in some embodiments, if the advertisement is flagged, the advertiser associated with that record must necessarily be on the list of advertisers prohibiting placement of some or all advertisements during restricted shows.

In some embodiments, there are multiple lists of advertisers prohibiting advertisement placement. These lists can be maintained on a per-show basis, so that all advertisers prohibiting placement of advertisements in show A are on one list, while advertisers prohibiting placement of advertisements in show B are on a second list. In some implementations, the lists can be implanted by flagging advertiser records, so that a first flag on the advertiser's record indicates a first restricted show, and a second flag on the advertiser's record indicates a second restricted show. Also, in some embodiments, advertisers can be permitted to choose a customized buffer period, and that information can also be included in the advertiser's record, or elsewhere.

As shown by block 235, if the spot break is within a blackout time, and the advertisement is prohibited from being placed during the blackout time, then another advertisement can be chosen for consideration, and method 220 returns to block 231 to determine if scheduling the newly selected advertisement during the blackout period is prohibited.

As illustrated by block 237, if the decision made at block 233 indicates that the advertisement being considered for placement is not associated with an advertiser in the list of advertisers prohibiting placement of an advertisement during the restricted show, the advertisement can be scheduled in the spot break, subject to other scheduling rules. Thus, as shown by block 237, the advertisement being considered for scheduling will be scheduled in the spot break, subject to the normal advertisement scheduling rules, if either scheduling is not prohibited, or the spot break is not within a blackout time period.

As shown by block 239, once an advertisement is selected for insertion into the spot break, a check is made to determine if the more spot breaks need to be scheduled to complete the broadcast log. If there are more spot breaks to be scheduled, method 220 returns to block 221, and selects the next spot break to schedule. If there are not more spot breaks to schedule, the completed broadcast log can be delivered to a playout system, which can itself perform a verification to ensure that no advertisements are improperly scheduled.

Figure 18:
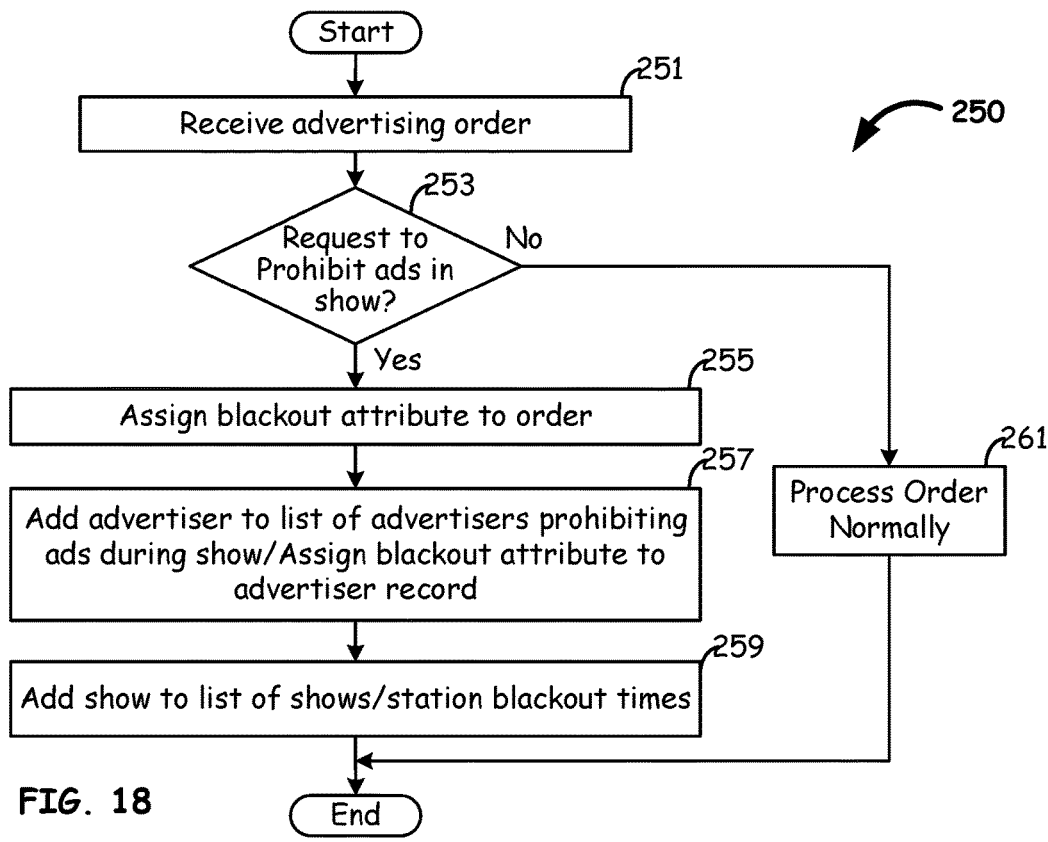
FIG. 18 is a flowchart illustrating a method of receiving an order for advertisements specifying restricted shows in which advertisements are to be prohibited from being placed, according to various embodiments of the present disclosure.

Referring next to FIG. 18, a method 250 of handling advertising orders will be discussed according to various embodiments of the present disclosure. As illustrated by block 251, an advertising order is received at an ordering system. At block 253, the order is checked for requests to prohibit advertisements from being scheduled during one or more restricted shows. If the order does not include any such requests, the order is processed normally, as shown by block 261. If the order includes a prohibition against scheduling advertisements during one or more restricted shows, blackout attributes can be assigned to advertiser records, and/or the advertiser associated with the request or prohibition can be added to a list of advertisers who do not want their advertisements aired during a prohibited show. As used herein, adding an advertiser to a list includes, but is not limited to, adding a flag or other information to an advertiser's record in, for example, a relational database. Thus, in some embodiments, adding blackout attributes to an advertiser's record is considered to be adding the advertiser to a list.

As illustrated at block 259, in addition to adding the advertiser to a list, an ordering system can also add a show associated with the advertiser's prohibition to a list of restricted shows, if the show is not already included in the list. For example, if a particular show is considered by an advertiser to be too controversial, and the advertiser prohibits its advertisements from being aired during that controversial show, the ordering system, or some other portion of an integrated media automation system, can flag a record associated with the show. Marking the show's record with a blackout indicator can be used alone or in conjunction with other information, to notify a scheduling system that scheduling spot breaks within the show might require special action on the part of the scheduling system to prevent prohibited scheduling of an advertisement.

As also illustrated by block 259, access to currently scheduled shows can be provided to an ordering system, and the ordering system can mark the times during which the restricted show is scheduled as blackout times. In some embodiments, the ordering system can pass order information to a scheduling system during an order intake process, and allow the scheduling system to set blackout times and flag the appropriate records. Blackout times can also be marked during other phases of the scheduling process.

Figure 19:
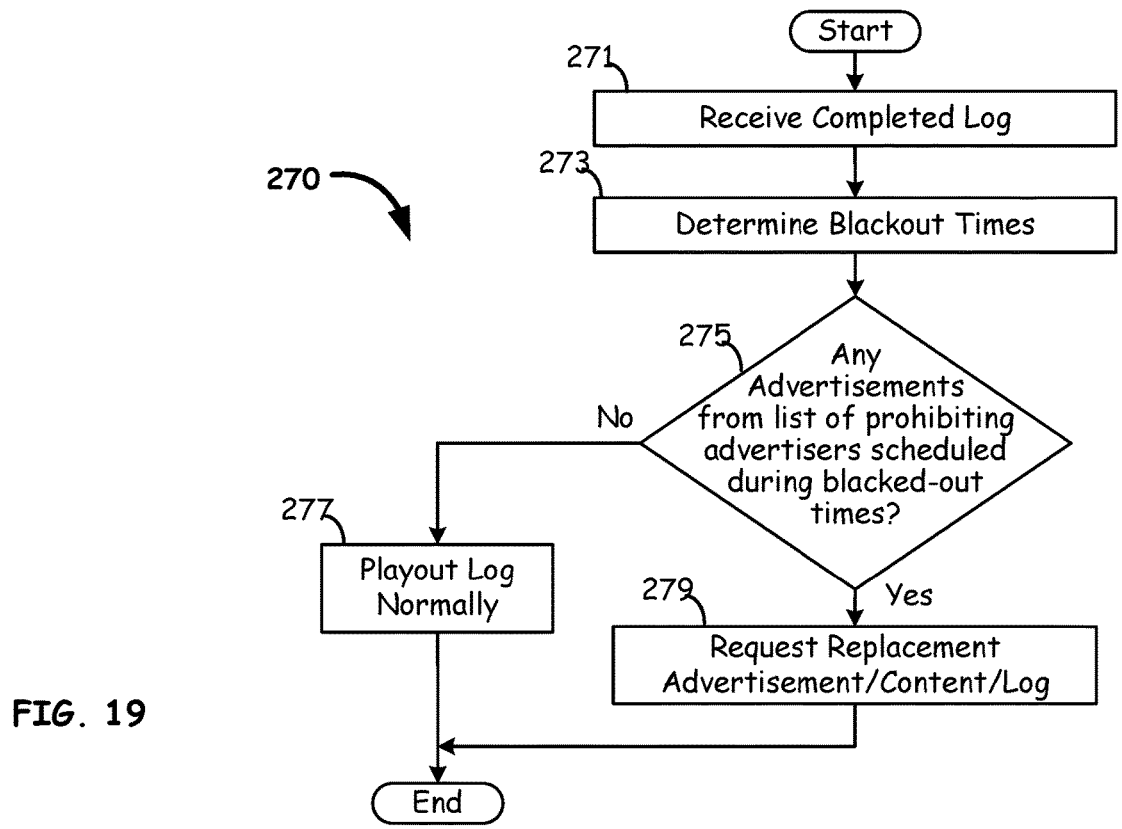
FIG. 19 is a flowchart illustrating verification of advertisements scheduled in a log that includes a restricted show, according to various embodiments of the present disclosure.

Referring next to FIG. 19, a method 270 of verifying, at a playout system, proper advertisement scheduling is discussed according to various embodiments of the present disclosure. As shown by block 271, the playout system receives a completed broadcast log from a scheduling system. Blackout times corresponding to restricted shows can be determined, as illustrated by block 273. The blackout times can be determined based on information included in the broadcast log, based on information included in metadata files associated with media files scheduled in the broadcast log, based on information from an ordering system, based on information included in advertiser records, advertisement records, show records, information from monitoring systems, or the like.

As illustrated by block 275, a check is made to see whether any advertisements associated with advertisers who have prohibited placement of their advertisements in restricted shows have been scheduled during the blackout times. In some embodiments, this determination can be based on lists of allowed advertisements, lists of prohibited advertisements, information included in the broadcast log, information included in metadata files associated with media files scheduled in the broadcast log, based on information from an ordering system, based on information included in advertiser records, advertisement records, show records, information from monitoring systems, or the like.

If the playout system determines that an advertisement has been improperly scheduled during a restricted show, or in a buffer around the restricted show, a replacement advertisement can be requested, as shown in block 279. If there are no advertisements improperly scheduled during blackout periods, the log can be played out normally, as shown at block 277.

While the invention has been described with reference to the foregoing embodiments, other modifications will become apparent to those skilled in the art by study of the specification and drawings. For example, the foregoing description may apply in a television, video, and text broadcast context, where the automation playlist may comprise media events of audio and/or visual nature, and the broadcast equipment involve, for example, television broadcasting equipment. Also, the automation play list need not be generated by broadcast automation software, and may simply be an arrangement of media events generated by known music mixing software, such as Adobe Audition. It is thus intended that the following appended claims define the invention and include such modifications as fall within the spirit and scope of the invention.

What is claimed is:

1. A method comprising:
receiving, at a media playout system, a completed broadcast log transmitted from a media scheduling system, wherein the completed broadcast log includes a restricted show having blackout attributes, and media items scheduled in spot breaks subject to the blackout attributes;
determining, at the media playout system, a blackout period assigned to the restricted show, wherein the blackout period indicates a period of time associated with the restricted show during which at least one media item is prohibited from being scheduled;
determining, locally at the media playout system and prior to airing of the restricted show, that the completed broadcast log transmitted from the media scheduling system indicates that the at least one media item has been improperly scheduled during the blackout period; and
in response to determining, prior to airing of the restricted show, that the at least one media item has been improperly scheduled during the blackout period that the at least one media item has been improperly scheduled during the blackout period, transmitting, from the media playout system to the media scheduling system prior to airing of the restricted show, a message requesting a replacement media item to replace the at least one media item that has been improperly scheduled during the blackout period.

2. The method of claim 1, further comprising:
determining the blackout period based on information included in one or more lists of media items.

3. The method of claim 1, further comprising:
determining the blackout period based on information obtained from an ordering system.

4. The method of claim 1, wherein the blackout period includes a buffer period adjacent to the restricted show.

5. The method of claim 1, further comprising:
determining the blackout period based, at least in part, on a blackout attribute included in metadata associated with the at least one media item.

6. The method of claim 1, further comprising:
determining the blackout period based, at least in part, on a blackout attribute included in the completed broadcast log.

7. The method of claim 1, further comprising:
determining the blackout period based, at least in part, on a blackout attribute included in metadata associated with an advertiser record.

8. A media automation system comprising:
an order entry system including a processor and associated memory;
a scheduling system including a processor and associated memory, the scheduling system coupled to the order entry system;
a media playout system including a processor and associated memory, the media playout system coupled to the scheduling system;
the scheduling system configured to:
receive information associated with advertising orders from the order entry system, the information associated with advertising orders including information identifying advertiser restrictions associated with restricted shows;
generate completed broadcast logs;
the media playout system configured to:
receive a completed broadcast log transmitted from a media scheduling system, wherein the completed broadcast log includes a restricted show having blackout attributes, and media items scheduled in spot breaks subject to the blackout attributes;

determine a blackout period assigned to the restricted show, wherein the blackout period indicates a period of time associated with the restricted show during which at least one media item is prohibited from being scheduled;

determine locally, prior to airing the restricted show, that the completed broadcast log transmitted from the media scheduling system indicates that the at least one media item has been improperly scheduled during the blackout period; and transmit, to the media scheduling system prior to airing the restricted show, a message requesting a replacement media item to replace the at least one media item that has been improperly scheduled during the blackout period.

9. The media automation system of claim 8, wherein the media playout system is further configured to:

determine the blackout period based on information included in one or more lists of media items.

10. The media automation system of claim 8, wherein the blackout period includes a buffer period adjacent to the restricted show.

11. The media automation system of claim 8, wherein the media playout system is further configured to:

determine the blackout period based, at least in part, on a blackout attribute included in metadata associated with the at least one media item.

12. The media automation system of claim 8, wherein the media playout system is further configured to:

determine the blackout period based, at least in part, on a blackout attribute included in the completed broadcast log.

13. The media automation system of claim 8, wherein the media playout system is further configured to:

determine the blackout period based, at least in part, on a blackout attribute included in metadata associated with an advertiser record.

* * * * *